US012786562B2

(12) United States Patent
Motoyama et al.

(10) Patent No.: US 12,786,562 B2
(45) Date of Patent: Nov. 3, 2026

(54) INFORMATION PROCESSING METHOD, INFORMATION PROCESSING DEVICE, COMMUNICATION SYSTEM, AND COMPUTER PROGRAM

(71) Applicant: Sony Group Corporation, Tokyo (JP)

(72) Inventors: Takuto Motoyama, Tokyo (JP); Takashi Konno, Chiba (JP)

(73) Assignee: SONY GROUP CORPORATION, Tokyo (JP)

(*) Notice: Subject to any disclaimer, the term of this patent is extended or adjusted under 35 U.S.C. 154(b) by 31 days.

(21) Appl. No.: 18/860,695

(22) PCT Filed: May 11, 2023

(86) PCT No.: PCT/JP2023/017719

§ 371 (c)(1),
(2) Date: Oct. 28, 2024

(87) PCT Pub. No.: WO2023/223933

PCT Pub. Date: Nov. 23, 2023

(65) Prior Publication Data

US 2025/0294249 A1 Sep. 18, 2025

(30) Foreign Application Priority Data

May 18, 2022 (JP) ................................ 2022-081883

(51) Int. Cl.
*H04N 23/67* (2023.01)
*H04N 23/63* (2023.01)
*H04N 23/69* (2023.01)

(52) U.S. Cl.
CPC .................................. *H04N 23/67* (2023.01)

(58) Field of Classification Search
CPC ........ H04N 23/67; H04N 23/63; H04N 23/66; H04N 23/661; H04N 23/675; H04N 23/69;
(Continued)

(56) References Cited

U.S. PATENT DOCUMENTS

| | | | | |
|---|---|---|---|---|
| 2009/0102841 | A1* | 4/2009 | Clavadetscher | H04N 13/275 345/420 |
| 2015/0142213 | A1* | 5/2015 | Wang | G05F 3/04883 701/2 |
| 2022/0350330 | A1* | 11/2022 | Wang | G06F 3/012 |

FOREIGN PATENT DOCUMENTS

| | | |
|---|---|---|
| JP | 2010-177741 A | 8/2010 |
| JP | 2018-201240 A | 12/2018 |

(Continued)

*Primary Examiner* — Marly S Camargo
(74) *Attorney, Agent, or Firm* — Paratus Law Group, PLLC

(57) ABSTRACT

There is provided an information processing method to easily recognize a region focused by a shooting camera. The information processing method according to the present disclosure includes: placing a virtual camera in a virtual environment space obtained by modeling a target environment in which a mobile object equipped with a shooting camera is allowed to move, the virtual camera being associated with the shooting camera; determining a virtual focus region in the virtual environment space on the basis of an image corresponding to the field range of the virtual camera, the virtual focus region corresponding to a region focused by the shooting camera in the target environment; and displaying region-specific information on a display screen, the region-specific information specifying the virtual focus region.

23 Claims, 27 Drawing Sheets

(58) Field of Classification Search
CPC .... B64U 10/13; B64U 20/87; B64U 2101/30; B64U 2201/20; G06V 10/7715; G06V 30/19127; G06T 19/00
See application file for complete search history.

(56) References Cited

FOREIGN PATENT DOCUMENTS

| | | | |
|---|---|---|---|
| WO | WO 2018/012395 | A1 | 1/2018 |
| WO | WO 2018/150831 | A1 | 8/2018 |

* cited by examiner

70: THREE-DIMENSIONAL ENVIRONMENT MAP

70: THREE-DIMENSIONAL ENVIRONMENT MAP

FUTURE TIME

70: THREE-DIMENSIONAL ENVIRONMENT MAP (A) PREPARATION

70: THREE-DIMENSIONAL ENVIRONMENT MAP (B) CONFIRMATION BY SIMULATION

INFORMATION PROCESSING METHOD, INFORMATION PROCESSING DEVICE, COMMUNICATION SYSTEM, AND COMPUTER PROGRAM

CROSS REFERENCE TO PRIOR APPLICATION

This application is a National Stage Patent Application of PCT International Patent Application No. PCT/JP2023/017719 (filed on May 11, 2023) under 35 U.S.C. § 371, which claims priority to Japanese Patent Application No. 2022-081883 (filed on May 18, 2022), which are all hereby incorporated by reference in their entirety.

TECHNICAL FIELD

The present disclosure relates to an information processing method, an information processing device, a communication system, and a computer program.

BACKGROUND ART

For various purposes such as measurement of a geographic environment, photography at a site of media reports, and sports photography, drones flying with cameras have been widely used in shooting of target environments. The focal point (a point where the focus is adjusted) of a drone camera is hard to recognize in real time during shooting. Whether an object to be photographed is correctly focused by a camera is recognized by confirming an image of the camera after shooting. When an object to be photographed is out of focus, the image of the object is blurred, which requires a retake. In the case of the sites of media reports and sports that require real-time shooting, a retack frequently becomes difficult.

If video data captured by a drone camera is always transmitted to the operating device of a drone operator (user), the operator can confirm a region brought into focus in real time. However, continuous transmission of video data is difficult because of restrictions on radio bands. Furthermore, also when an object to be photographed is brought into focus using the automatic focusing function of a camera, a drone may be difficult to move to track the object when moving or rotating at high speed.

CITATION LIST

Patent Literature

PTL 1: JP 2018-201240A

SUMMARY

Technical Problem

The present disclosure has been devised in view of the problem and facilitates the recognition of a region focused by a shooting camera.

Solution to Problem

An information processing method according to the present disclosure includes: placing a virtual camera in a virtual environment space obtained by modeling a target environment in which a mobile object equipped with a shooting camera is allowed to move, the virtual camera being associated with the shooting camera; determining a virtual focus region in the virtual environment space on the basis of an image corresponding to the field range of the virtual camera, the virtual focus region corresponding to a region focused by the shooting camera in the target environment; and displaying region-specific information on a display screen, the region-specific information specifying the virtual focus region.

DESCRIPTION OF EMBODIMENTS

Hereinafter, embodiments of the present disclosure will be described with reference to the drawings. In one or more embodiments shown in the present disclosure, the elements included in the embodiments can be combined with each other, and the combined result is also part of the embodiments shown in the present disclosure.

First Embodiment

Figure 1:
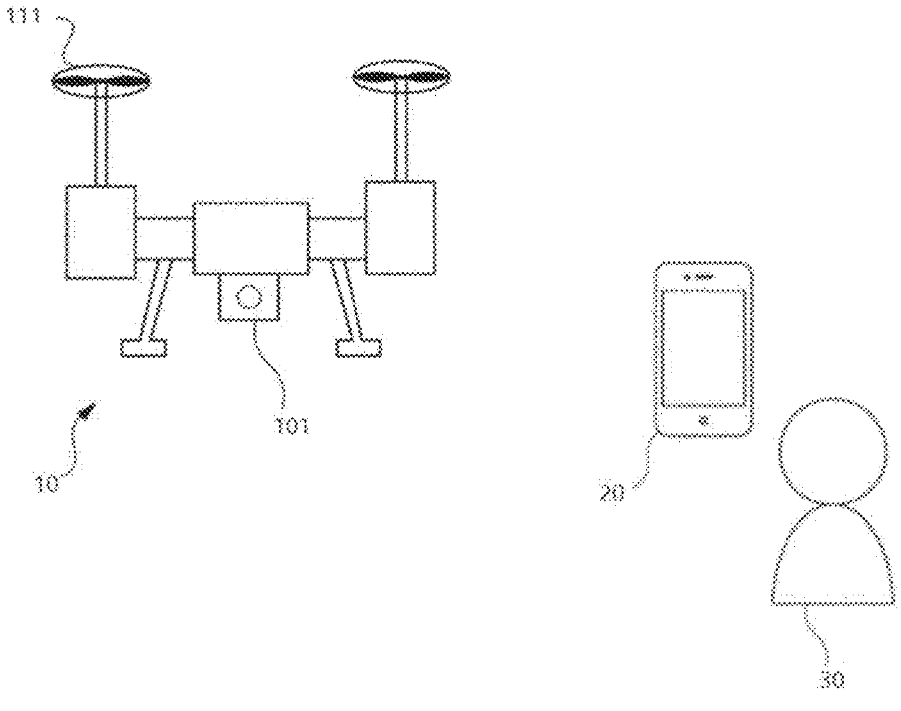
FIG. 1 illustrates a communication system according to a first embodiment of the present disclosure.

FIG. 1 illustrates a communication system 1 according to an embodiment of the present disclosure. The communication system 1 includes a drone 10 acting as a mobile object and an operating device 20 for operating the drone 10. The drone 10 includes a shooting camera 101 that captures an image of a target environment (target space). The drone 10 has rotors 111 that are driven by a drive system such as a motor in response to operation information (control signal) from the operating device 20, so that the drone 10 flies on a route indicated by a user 30 serving as an operator or a specified route. The mobile object according to the present disclosure is not limited to a drone and may be a vehicle such as an automated guided vehicle (AGV) or a truck or a robot or the like. The operating device 20 is a device for operating the drone 10 by the user 30.

The operations of the drone 10 include an operation of the shooting camera 101 as well as a flight operation of the drone body. The operations of the shooting camera 101 may include an operation for the orientation of the shooting camera 101 (that is, the attitude of the shooting camera 101) and an operation for the zoom mechanism of the shooting camera 101. When the shooting camera 101 is movably installed in the body of the mobile object, an operation for moving the shooting camera 101 may be included in the operations of the shooting camera 101. An example of an operation of the zoom mechanism is an optical zoom for changing a focal distance by moving the position of a lens. By changing the focal distance, a region or position focused by the shooting camera 101, in other words, a focal distance to a region or position to be focused is changed. The shooting camera 101 may further include an automatic focusing function.

A target environment for flight and shooting of the drone 10 may be any environment, e.g., a factory, a site of media reports, a sports arena, forest, or a town. The object to be photographed by the drone 10 may be a specific location (e.g., a specific address), a specific object (e.g., a specific building or plant), or a body (hereinafter referred to as an object) moving in a target environment. Examples of an object include a human, an animal, an insect, and an automobile. The object to be photographed is not limited to a specific object if the target is present in a target environment.

Figure 2:
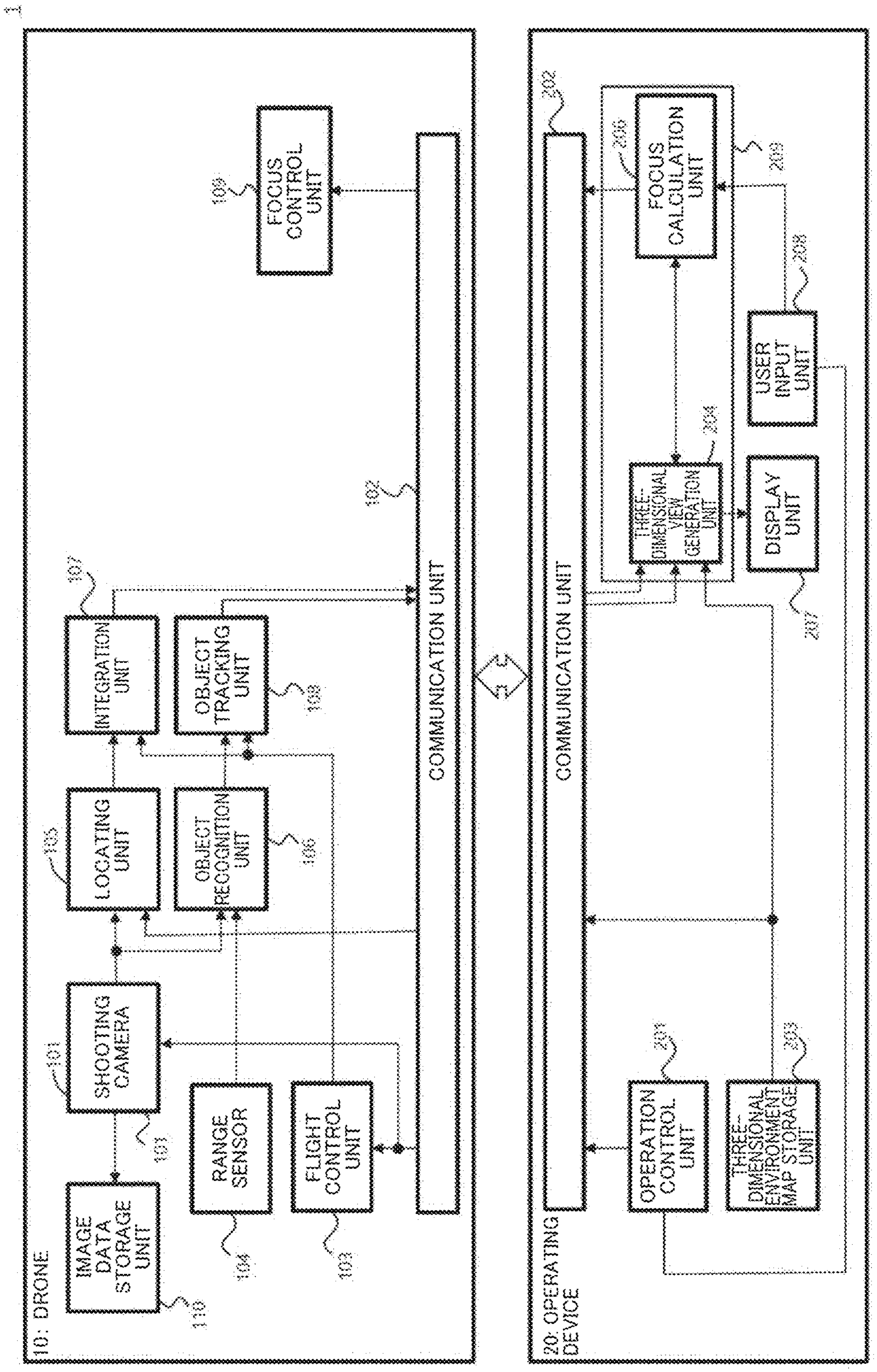
FIG. 2 is a block diagram of a drone and an operating device.

FIG. 2 is a block diagram of the drone 10 and the operating device 20. The drone 10 includes the shooting camera 101, a communication unit 102, a flight control unit 103, a range sensor 104, a locating unit 105, an object recognition unit 106, an integration unit 107, an object tracking unit 108, a focus control unit 109, and an image data storage unit 110. The functions of blocks 102, 103, and 105 to 109 may be implemented by causing a computer including processors such as a CPU (Central Processing Unit) to execute programs, may be implemented by circuits such as an ASIC and an FPGA, or may be implemented by a combination thereof.

The operating device 20 includes an operation control unit 201, a communication unit 202, a three-dimensional environment map storage unit 203, a three-dimensional view generation unit 204, a focus adjustment calculation unit 206, a display unit 207, and a user input unit 208. The three-dimensional view generation unit 204 and the focus adjustment calculation unit 206 constitute a processing unit 209. The functions of blocks 201, 202, 204, 206, and 208 may be implemented by causing a computer including processors such as a CPU to execute programs, may be implemented by circuits such as an ASIC (Application Specific Integrated Circuit) and an FPGA (Field-Programmable Gate Array), or may be implemented by a combination thereof.

The communication unit 202 in the operating device 20 conducts radio communications with the communication unit 102 in the drone 10. The communication unit 202 includes a circuit for processing a communication protocol, an AD (Analog to Digital)/DA (Digital to Analog) converter, a frequency converter, a band-pass filter, an amplifier, and one or more antennas. The communication protocol and a radio frequency band are not specifically limited.

The communication unit 102 in the drone 10 conducts radio communications with the communication unit 202 in the operating device 20. The communication unit 102 includes a circuit for processing a communication protocol, an AD/DA converter, a frequency converter, a band-pass filter, an amplifier, and an antenna. The communication protocol and a radio frequency band are not specifically limited. Moreover, a mobile object according to the present disclosure or the drone 10 may conduct wire communications with the operating device 20.

The three-dimensional environment map storage unit 203 in the operating device 20 stores a three-dimensional environment map that is a virtual environment space obtained by modeling a target environment for flight and shooting of the drone 10. For example, the three-dimensional environment map (virtual environment space) can be produced on the basis of multiple images of a target environment captured from multiple eyepoints. Specifically, photogrammetry or the like can be used as a technique for producing the three-dimensional environment map.

Figure 3:
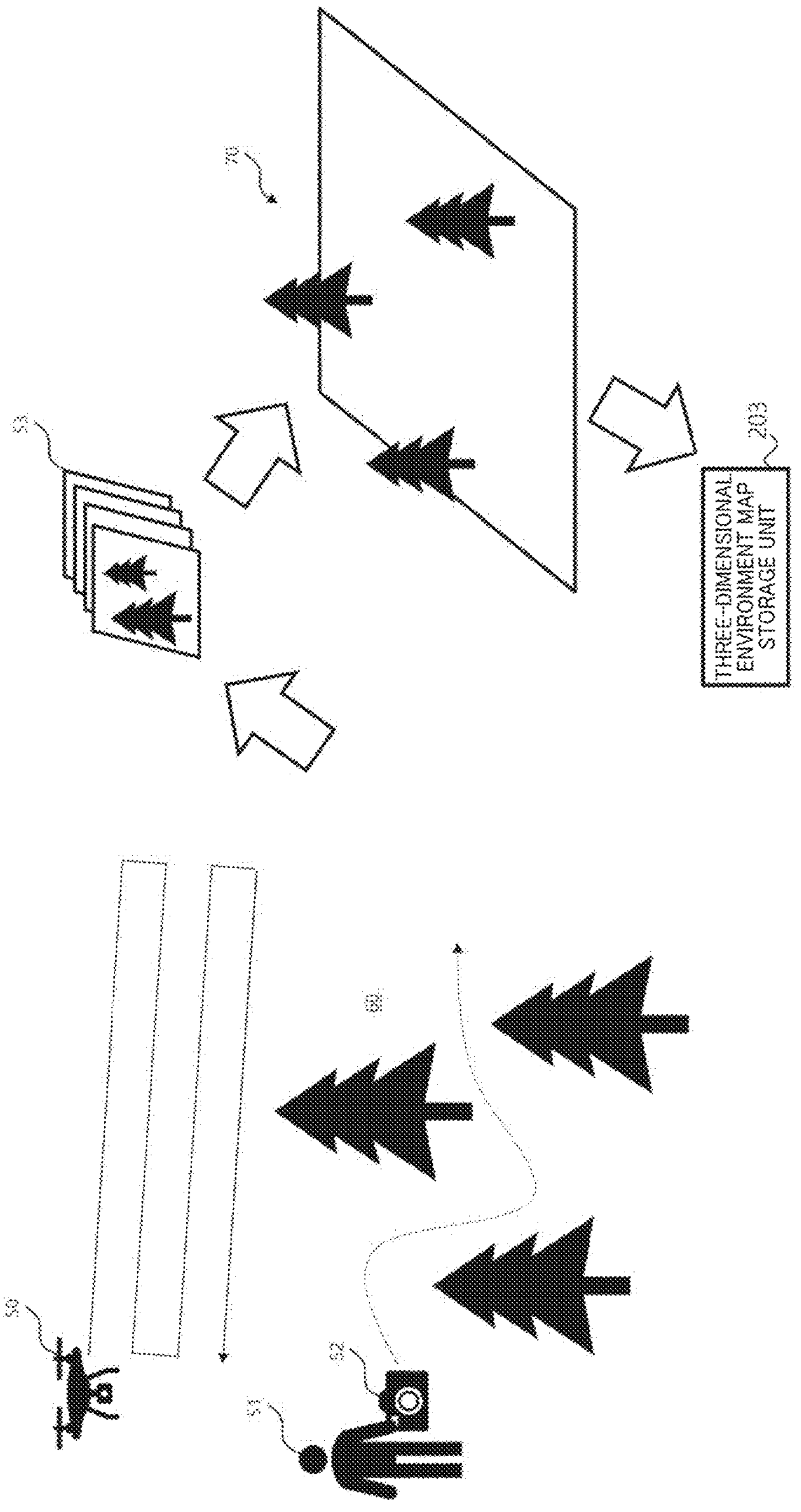
FIG. 3 is a schematic drawing of the process of producing a three-dimensional environment map.

FIG. 3 is a schematic drawing of the process of producing a three-dimensional environment map.

In order to produce a three-dimensional environment map, a target environment is photographed in advance by a shooting camera from various eyepoints. The target environment may be photographed by a mobile object 50 such as a drone flying in a target environment 60 or a user 51 such as an operator who moves with a hand-held camera 52 in the target environment 60. The mobile object 50 may be the drone 10 or a mobile object different from the drone 10. On the basis of multiple images 53 captured in advance, the user causes a computer to execute the program of a photogrammetry tool, so that a three-dimensional environment map 70 is generated. The data of the generated three-dimensional environment map 70 is stored in the three-dimensional environment map storage unit 203. In order to adjust the distance scale of the three-dimensional environment map 70 strictly to a real space, GPS (Global Positioning Satellite) information upon shooting, information about a range sensor of LiDAR (Light Detection and Ranging, Laser Imaging Detection and Ranging) or the like, and coordinate information or the like about a control point (precisely located point) placed in a shooting environment may be used.

Figure 4:
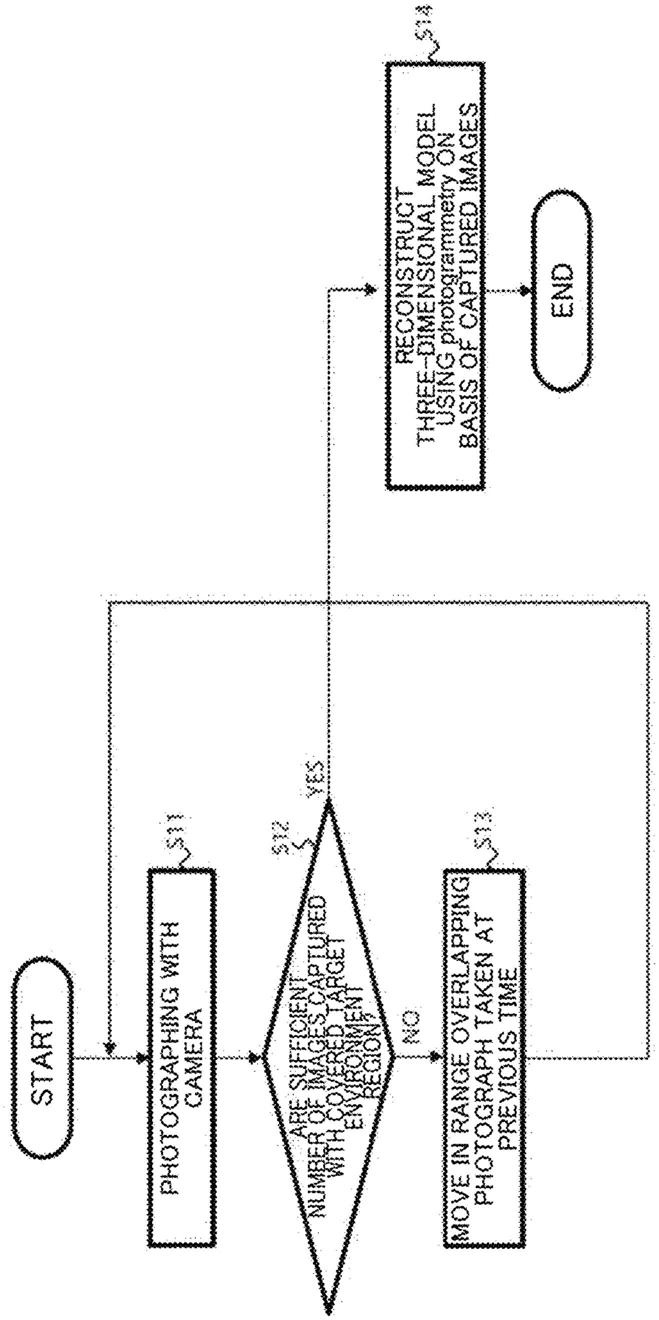
FIG. 4 is a flowchart showing an example of the process of producing a three-dimensional environment map.

FIG. 4 is a flowchart showing an example of the process of producing the three-dimensional environment map. In this example, shooting is performed by the mobile object 50. The mobile object 50 flies in the target environment 60 and performs shooting with the camera of the mobile object 50 (S11). Data of a captured image is stored in the storage unit in the mobile object 50. The processing unit such as a CPU in the mobile object 50 determines whether a shooting completion condition about a sufficient number of captured images has been satisfied in the overall target environment 60 (S12). The sufficient number of captured images indicates that regions between captured images overlap with a certain size or larger between adjacent times. When the shooting completion condition is not satisfied, the mobile object 50 moves in a range where an image captured at the previous time and a shooting region overlap with a certain ratio or larger (S13), and shooting is performed by the camera (S11). Shooting is completed when the shooting completion condition is satisfied. Thereafter, images stored in the storage unit of the mobile object 50 are read by the computer, and a three-dimensional environment map is generated by the computer using photogrammetry. The computer may be the operating device 20 in FIG. 2 or the mobile object 50.

The user input unit 208 is an input unit on which the user inputs various kinds of operation information or operation instructions. The user input unit 208 is, for example, a touch panel, a stick, a button, a directional button, or a combination thereof. Examples of operation information input from the user input unit 208 include operation information (e.g., operation information about a speed and a direction) about the drone 10 and operation information (e.g., operation information about the attitude of the shooting camera 101) about the shooting camera 101. As another example of the operation information, one of autonomous flight and manual flight of the drone 10 may be specified. When autonomous flight is specified, a route for autonomous flight may be further specified. Moreover, as the operation information, an instruction to switch screens displayed on the display unit 207 may also be input.

The operation control unit 201 receives the operation information about the drone 10 or the shooting camera 101 through the user input unit 208, converts the received operation information into a control instruction format interpretable by the drone 10 or the shooting camera 101, and transmits the information to the drone 10. More specifically, the operation control unit 201 transmits a control instruction to the communication unit 202, and the communication unit 202 transmits the control instruction to the drone 10.

The communication unit 102 of the drone 10 receives the control instruction from the operating device 20. The communication unit 102 classifies received control instructions, transmits control instructions for a flight operation and an operation of the shooting camera 101 to the flight control unit 103, and transmits a control instruction for an operation of the shooting camera 101 to the shooting camera 101.

The flight control unit 103 generates flight control information on the basis of the control instruction for a flight operation and transmits control information to a drive system, which is not illustrated. The drive system includes a plurality of ESCs (Electric Speed Controllers), a plurality of motors, and a plurality of rotors (see the rotors 111 in FIG. 1). The ESC drives the corresponding motor on the basis of the control information and rotates the rotor connected to the shaft of the motor. This allows the drone 10 to fly in a desired direction and at a desired speed, and to stop (hover) in a desired position.

Furthermore, the flight control unit 103 acquires at least one of position information and speed information about the drone 10 and orientation information (attitude information) about the shooting camera 101 at regular intervals, and transmits the acquired information to the integration unit 107. Moreover, the flight control unit 103 transmits the acquired information to the object tracking unit 108. The time sequence of at least one of the position information and the speed information about the drone 10 corresponds to motion information about the drone 10. The time sequence of the orientation information about the shooting camera 101 corresponds to motion information about the shooting camera 101. Therefore, the motion information about the drone 10 and the motion information about the shooting camera 101 are based on the operation information input to the operating device 20 by the user.

A method for acquiring the position information about the drone 10 by the flight control unit 103 may be performed on the basis of the history of control instructions for flight operations. Alternatively, the method may be performed using at least one of sensors including a GPS (Global Positioning Satellite) sensor and an IMU (Inertial Measurement Unit). The history of control instructions, a GPS, and an IMU or the like may be combined. Alternatively, in the presence of a server that manages the position of the drone 10, the flight control unit 103 may acquire position information about the drone 10 by sending inquiry data to the server. The operating device 20 may have the function of the server that manages the position of the drone 10.

A method for acquiring the orientation information about the shooting camera 101 by the flight control unit 103 may be performed on the basis of the history of control instructions for operations of the shooting camera 101. Alternatively, if the shooting camera 101 has the function of detecting or managing the orientation of the device, the flight control unit 103 may acquire orientation information about the shooting camera 101 by sending inquiry data to the shooting camera 101.

The shooting camera 101 is an imaging device that photographs a target environment where the drone 10 flies. Shooting is performed at regular intervals. The shooting camera 101 may be any camera, e.g., an RGB camera, a monochrome camera, an infrared camera, a stereo camera, or a depth camera if an environment around the camera can be photographed. Image data acquired by the shooting camera 101 is assumed to be a moving image but may be a still image.

Figure 5:
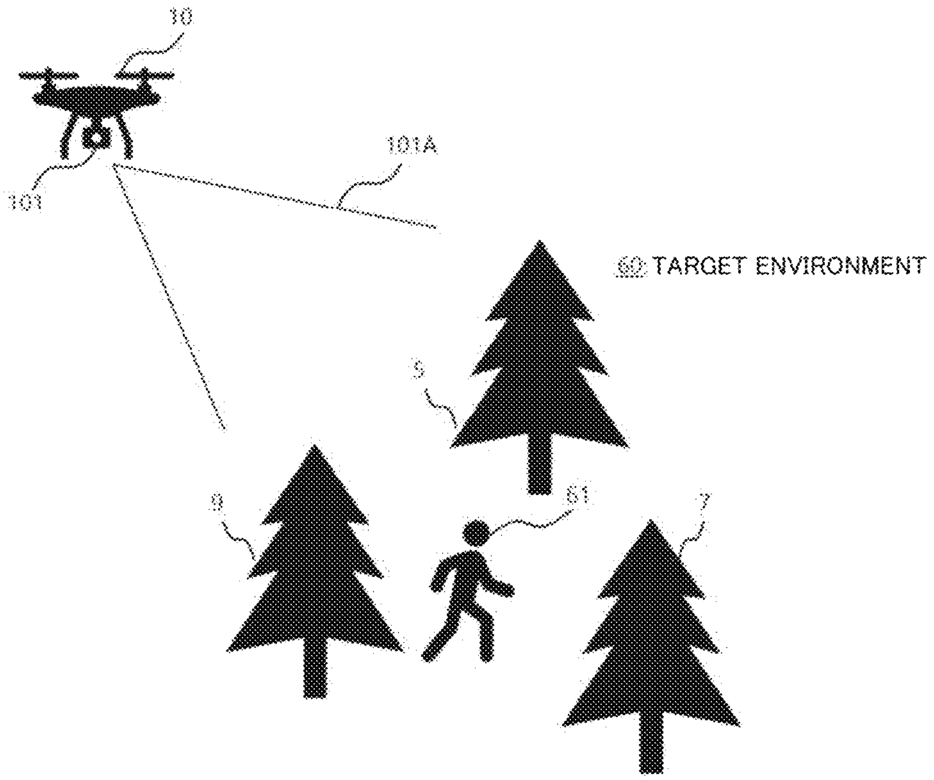
FIG. 5 shows a state in which the drone flies in a target environment and a shooting camera takes photographs.

FIG. 5 shows that the drone 10 flies in the target environment 60 and the shooting camera 101 photographs the target environment 60. The shooting camera 101 has a field angle 101A (field range). The target environment 60 includes a target object 61 that is an object to be photographed. In the present example, the target object 61 is a human walking or running in forest. Moreover, objects 5, 7, and 9 are placed as other objects in the target environment 60. The objects 5, 7, and 9 are tree objects.

Image data captured by the shooting camera 101 is stored in the image data storage unit 110. Moreover, the image data captured by the shooting camera 101 is selected at regular intervals. For example, when X images are captured in a period at regular intervals, the latest image data of the X images is selected. The selected image data is transmitted to the locating unit 105 and the object recognition unit 106. In this way, processing by the locating unit 105 and the object recognition unit 106 is performed only on the image data selected at regular intervals but is not performed on all the pieces of image data captured by the shooting camera 101. This can reduce the throughput of a block subsequent to the shooting camera 101.

The image data storage unit 110 stores image data captured by the shooting camera 101. The image data storage unit 110 includes, for example, a hard disk, a RAM (Random Access Memory) disk, and nonvolatile memory. After the completion of the flight of the drone 10, the image data stored in the image data storage unit 110 is read via radio communications, wire communications, or a recording medium (e.g., a memory card), and the contents of the image data can be confirmed by an operator. The image data captured by the shooting camera 101 may be transmitted to the operating device 20 and may be displayed on the display unit 207 in real time. In this case, the image data may be intermittently transmitted, and the image data may be compressed. The display unit 207 is, for example, a liquid crystal display panel or an organic EL panel that can display data or information.

The shooting camera 101 can change the photographing direction, that is, the orientation (attitude) of the camera body. For example, the shooting camera 101 may be provided on the drone 10 via a three-axis gimbal. In this case, the orientation of the shooting camera 101 can be changed by controlling the three-axis gimbal on the basis of operation information (control instruction) from an operator. The shooting camera 101 may be movable along a rail or the like in the drone 10, and the position of the shooting camera 101 can be changed relative to the drone 10. In this case, the relative position of the shooting camera 101 can be changed in response to an operation by the operator. In the present embodiment, it is assumed that the position of the shooting camera 101 is fixed in the drone 10. In this case, the position of the drone 10 and the position of the shooting camera 101 have one-to-one correspondence in the coordinate system of the target environment. In other words, the position of the shooting camera 101 is fixed when the position of the drone 10 is determined.

The locating unit 105 of the drone 10 transmits a request asking acquisition of a three-dimensional environment map to the operating device 20, and acquires data of the three-dimensional environment map from the operating device 20. More specifically, in the operating device 20, when the communication unit 202 receives the request asking acquisition of a three-dimensional environment map from the drone 10, the communication unit 202 reads the three-dimensional environment map from the three-dimensional environment map storage unit 203 on the basis of the acquisition request. The communication unit 202 transmits the data of the three-dimensional environment map to the drone 10. The communication unit 102 transmits the data of the three-dimensional environment map received from the operating device 20 to the locating unit 105. Moreover, the locating unit 105 may be configured not to transmit the acquisition request. For example, the data of the three-dimensional environment map is transmitted from the operating device 20 autonomously or according to the transmission instruction of the user, and the locating unit 105 acquires the data of the three-dimensional environment map transmitted from the operating device 20.

On the basis of image data received from the shooting camera 101 at regular intervals, the locating unit 105 determines a position corresponding to the position of the shooting camera 101 in the three-dimensional environment map (intra-map corresponding position) and an orientation corresponding to the orientation of the shooting camera 101 in the three-dimensional environment map (intra-map corresponding orientation). For example, image data is checked against the three-dimensional environment map to retrieve a position and an orientation that are closest to the image data. As a checking method, for example, one or more feature points (e.g., a corner or a point having considerably changed in brightness) and the feature amounts of the feature points are calculated in image data, and a feature amount vector including the feature amounts of the feature points is obtained. Likewise, image data (model image data) viewed from any position and any direction in the three-dimensional environment map is acquired, and a model feature amount vector for model image data is similarly obtained. A position and an orientation, at which a model feature amount vector matching or approximating the feature amount vector of image data, are determined as the intra-map corresponding position and the intra-map corresponding orientation of the shooting camera 101. For example, the approximation indicates that the absolute value of a difference between feature amount vectors is equal to or smaller than a threshold value. The checking method is merely exemplary, and thus other methods may be used. For example, a position and an orientation, at which the sum of differences between pixels of image data and model image data is minimized, may be determined as the intra-map corresponding position and the intra-map corresponding orientation of the shooting camera 101.

The integration unit 107 integrates the motion information about the drone 10, the motion information about the shooting camera 101, and the intra-map corresponding position and the intra-map corresponding orientation of the shooting camera 101 into a set of data, the motion data being acquired by the flight control unit 103, the corresponding position and orientation being estimated by the locating unit 105. The integrated set of data will be referred to as integrated data. The motion information about the drone 10 includes, for example, at least one of the position information and the speed information at the predetermined intervals. The motion information about the shooting camera 101 may include, for example, orientation information at the predetermined intervals and may further include position information at the regular intervals. The integration unit 107 transmits the integrated data of the operating device 20 via the communication unit 102. When the position information about the shooting camera 101 and the position information about the drone 10 have one-to-one correspondence, only the position information about one of the shooting camera 101 and the drone 10 may be included in the integrated data. Furthermore, the motion information about the drone 10 and the motion information about the shooting camera 101 may be converted into motion information in the three-dimensional environment map, and the converted information may be included in the integrated data.

The range sensor 104 of the drone 10 measures a region in a detection range at regular time intervals and generates distance data including distance values to positions in the detection range. The distance data includes a distance value for each pixel. The range sensor 104 transmits the distance data to the object recognition unit 106. For example, the detection range of the range sensor 104 is the same as or at least partially overlaps the shooting range (field range) of the shooting camera 101. The range sensor 104 is, for example, an LiDAR (Light Detection and Ranging, Laser Imaging Detection and Ranging), a stereo camera, a radar, or a monocular camera.

The object recognition unit 106 detects an object to be photographed (target object), on the basis of image data from the shooting camera 101. The object recognition unit 106 calculates the position of the detected target object on the basis of the distance data. The object recognition unit 106 transmits the position information about the target object to the object tracking unit 108. It is assumed that the correspondence between the shooting range (field range) of the shooting camera 101 and the detection range of the range sensor 104 is acquired in advance. Thus, the position of any object included in the image data can be calculated from the distance data. The type of target object may be determined in advance. The target object may be a moving object (dynamic object) or a nonmoving object (static object). For example, the dynamic object may be a human moving in forest when the target environment is forest. In a soccer game, the moving object may be a player in the game. The dynamic object is not limited to a human and may be a vehicle such as an automobile, an insect, or an animal. Moreover, the static object may be any object, for example, an architecture or a landscape. In addition to the position of the target object, the orientation of the target object may be detected by, for example, analyzing image data.

The object tracking unit 108 performs tracking on the target object on the basis of motion information about the drone 10 (or the shooting camera 101) from the flight control unit 103 and position information about the target object detected by the object recognition unit 106. Thus, the motion of the target object is estimated. For example, the object tracking unit 108 estimates the motion of the target object for the length of the regular intervals, thereby obtaining motion information about the target object. Thus, motion information is obtained while the motion of the current target object is estimated. The object tracking unit 108 may include memory for storing the history of the positions or motions of the target object. In this case, the motion of the target object may be estimated on the basis of the history of positions or motions. The history of moving vectors may be calculated from a sequence of past positions, and the motion of the target object may be estimated from the history of moving vectors. The object tracking unit 108 transmits the position information and motion information about the target object to the operating device 20 via the communication unit 102. In addition to the position of the target object, orientation information the target object may also be transmitted when an orientation is detected.

The three-dimensional view generation unit 204 in the operating device 20 reads data of the three-dimensional environment map from the three-dimensional environment map storage unit 203 and acquires the integrated data from the drone 10 and the position information and motion information about the target object. The three-dimensional view generation unit 204 integrates the shooting camera 101 and the target object in the three-dimensional environment map, so that image data to be presented to the operator is generated as a three-dimensional view.

More specifically, the three-dimensional view generation unit 204 places a virtual camera (virtual eyepoint), which is associated with the shooting camera 101, with an intra-map corresponding orientation at the intra-map corresponding position of the shooting camera 101 in the three-dimensional environment map. The intra-map corresponding position of the shooting camera 101 corresponds to a first position determined by changing the position of the shooting camera 101 to a position in the three-dimensional environment map, and the intra-map corresponding orientation corresponds to a first orientation determined by changing the orientation of the shooting camera 101 to an orientation in the three-dimensional environment map.

Moreover, the field range of the virtual camera is set according to, for example, a camera parameter such as the field angle (field range) of the shooting camera 101. The field range of the virtual camera is set according to the correspondence of size or the like between the three-dimensional environment map and the target environment. Alternatively, the field range of the virtual camera may be a predetermined range.

On the basis of the position information about the target object, an object (virtual target object) corresponding to the target object is disposed in the three-dimensional environment map. Specifically, the position information about the target object is converted into a position in the three-dimensional environment map, and the virtual target object is disposed at the converted position (a position corresponding to the position of the target object in the three-dimensional environment map). Any object in the three-dimensional environment map may be referred to as a virtual object, and in particular, a virtual object corresponding to the target object may be referred to as a virtual target object. The shape of the virtual target object may be a shape predetermined according to the type of target object. The shape may be a rectangular solid, a sphere, a specific shape like a specific character, or a user-specified shape.

The target object to be photographed is a dynamic object that is not present in the target environment when the three-dimensional environment map is generated. The target object is not included in the three-dimensional environment map stored in the three-dimensional environment map storage unit 203. However, when the target object to be photographed by the drone 10 is a static object, the target object may be included in the target environment when the three-dimensional environment map is generated.

The three-dimensional view generation unit 204 generates image data in the field range of the virtual camera, from the three-dimensional environment map. In other words, a state captured by the shooting camera 101 in the target environment is emulated in the three-dimensional environment map. The three-dimensional view generation unit 204 displays image data generated by emulation on the display unit 207. Moreover, the three-dimensional view generation unit 204 moves the virtual camera and the virtual target object at a fixed frame rate on the basis of motion information about the shooting camera 101 (or motion information about the drone 10) and motion information about the target object. Image data including the position and orientation of the virtual camera at each frame rate and the position and orientation of the virtual target object is generated and is displayed on the display unit 207. The position and orientation of the virtual target object correspond to a third position and a third orientation for the placement of the virtual target object. In this way, a state captured by the shooting camera 101 in the target environment is emulated at a fixed frame rate in the three-dimensional environment map. This processing is performed, for example, for a period corresponding to the regular intervals. Thus, an image of a region in the three-dimensional environment map is displayed as a moving image on the display unit 207, the region corresponding to a region photographed by the drone 10. At this point, the target object to be photographed is displayed as a virtual target object that schematically represents a target object.

Figure 6:
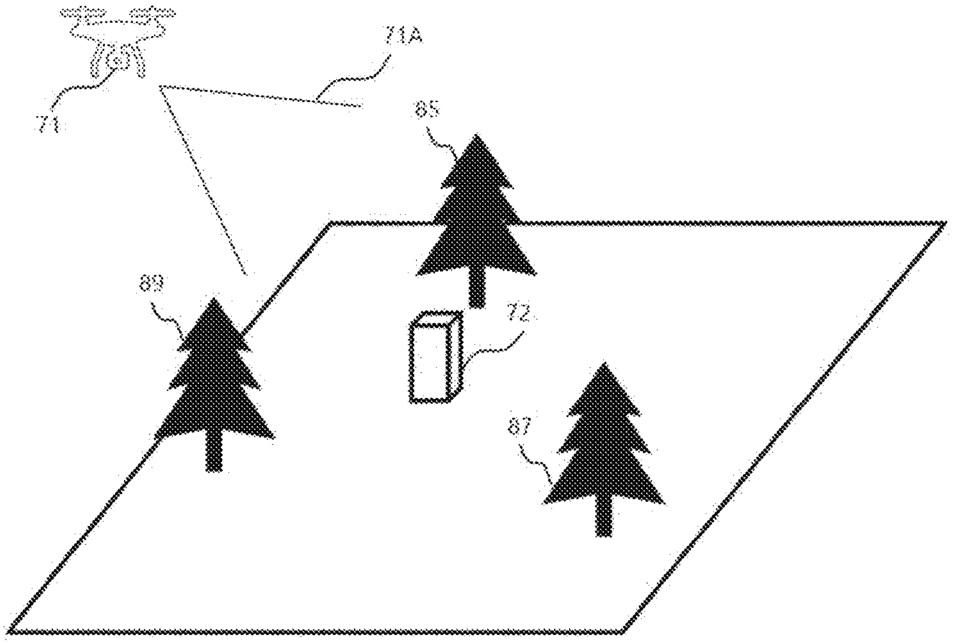
FIG. 6 is an explanatory drawing showing a specific example of processing performed by a three-dimensional view generation unit.
Figure 7:
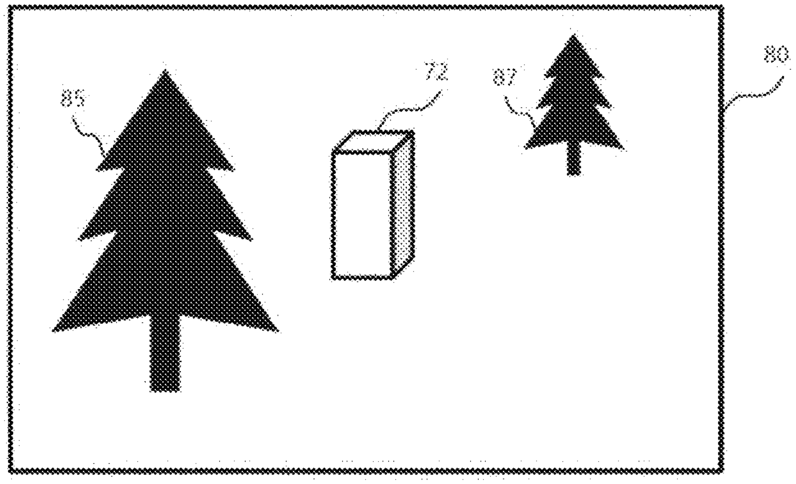
FIG. 7 is an explanatory drawing showing a specific example of processing performed by the three-dimensional view generation unit.

FIGS. 6 and 7 are explanatory drawings showing specific examples of processing performed by the three-dimensional view generation unit 204.

FIG. 6 illustrates an example in which a virtual camera 71 (virtual eyepoint) and a virtual target object 72 are disposed in the three-dimensional environment map 70. The virtual camera 71 is disposed at an intra-map corresponding position with an intra-map corresponding orientation. The virtual camera 71 has a field range 71A determined according to the field angle or the like of the shooting camera 101 and the correspondence between the target environment and the three-dimensional environment map. Although FIG. 6 illustrates a virtual drone provided with the virtual camera 71, only the virtual camera 71 may be disposed. The virtual target object 72 is a cubic object that schematically represents the human target object 61 shown in FIG. 5.

FIG. 7 shows an example of a three-dimensional view generated by the three-dimensional view generation unit 204. An image 80 in the field range 71A of the virtual camera 71 is displayed on the screen (display screen) of the display unit 207.

The focus adjustment calculation unit 206 determines or estimates a region corresponding to a region focused by the shooting camera 101 in the target environment, as a virtual focus region in the three-dimensional environment map on the basis of an image corresponding to the field range of the virtual camera (an image in the field range). The focused region (a region where the focus is adjusted) indicates that the entire region or at least a part of the region is included in the depth of field of the shooting camera 101. The depth of field is a distance range on the subject side in a view with adjusted focus.

The focus adjustment calculation unit 206 selects an object according to a first selection condition from at least one object (virtual object) included in an image in the field range of the virtual camera, and determines a region including the selected object as a virtual focus region. Also in the shooting camera 101, an object for focusing according to the same condition as the first selection condition may be selected.

For example, the first selection condition may include at least one of the following conditions:

- Condition for selecting a moving object from at least one object.
- Condition for selecting, from at least one object, an object on the basis of an area included in a first region range in an image (for example, an object having the largest area included in the first region range)
- Condition for selecting, from at least one object, an object included in a first distance range from the virtual camera In the example of the present embodiment, it is assumed that a region to be focused by the shooting camera 101 is a target object to be photographed. In other words, as the first selection condition, it is assumed that the condition for selecting a moving object is used.

The focus adjustment calculation unit 206 displays region-specific information, which is information for specifying the calculated virtual focus region, on the display unit 207 via the three-dimensional view generation unit 204. The region-specific information can include any information, for example, a line surrounding the virtual focus region (rectangular or circular frame) or a translucent image masking the virtual focus region. Thus, in the three-dimensional environment map, a region corresponding to a region expected to be focused by the shooting camera 101 can be visualized for the user. In other words, the user can expect that the shooting camera 101 is focused in a region in the target environment corresponding to a region in the three-dimensional environment map indicated by the region-specific information. For example, when the region-specific information indicates a region including the virtual target object, the user can expect that the shooting camera 101 is focused in a region including the target object corresponding to the virtual target object.

Figure 8:
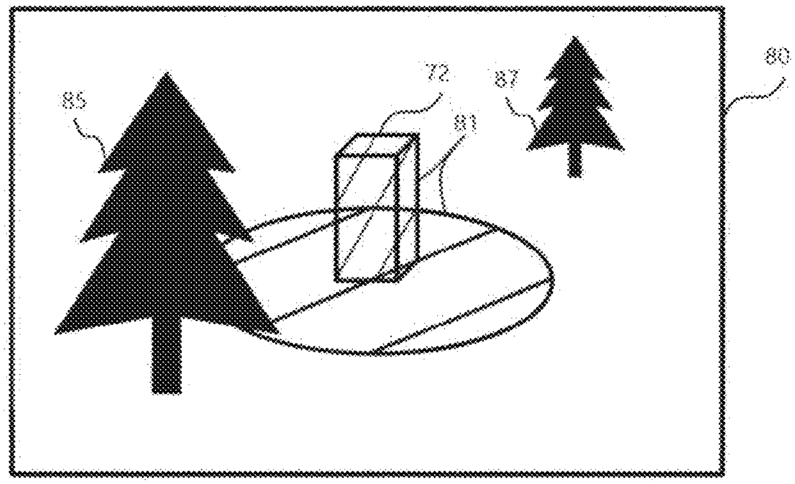
FIG. 8 illustrates an example in which region-specific information is displayed on a three-dimensional view screen in FIG. 7.

FIG. 8 illustrates an example in which region-specific information 81 is displayed on the three-dimensional view screen in FIG. 7. The region-specific information 81 is superimposed on the virtual target object 72 and a region around the virtual target object 72 and is indicated by oblique lines.

The user can input an instruction to change the virtual focus region indicated by the region-specific information 81, from the user input unit 208. In the instruction to change the virtual focus region, for example, another object may be tapped on the screen such that a region including the tapped object is detected as a virtual focus region indicated by the user. Alternatively, the user may provide an instruction to change the virtual focus region by moving region-specific information displayed on the display unit 207. In addition, a range may be specified by a finger or a pen as a region to be focused on the screen.

When an instruction to change the virtual focus region is input from the user input unit 208, the focus adjustment calculation unit 206 calculates a distance to the changed virtual focus region. The focus adjustment calculation unit 206 converts the calculated distance into a distance of the target environment. The focus adjustment calculation unit 206 generates focus adjustment instruction information for providing an instruction to adjust the focus (achieve focus) to the converted distance and transmits the information to the drone 10 through the communication unit 202. The focus adjustment instruction information corresponds to information for providing an instruction to focus a region in the target environment, the region corresponding to the changed virtual focus region. The focus control unit 109 of the drone 10 adjusts the focus of the shooting camera 101 according to the focus adjustment instruction information. For example, a camera parameter value to be set for the shooting camera 101 is determined on the basis of information in which a distance and a camera parameter value are associated with each other, and then the camera parameter is set to the determined value. The camera parameter includes, for example, a lens position or a focal distance. For example, a focal distance is adjusted to be focused on an object located at the converted distance.

In the absence of a user input for a change instruction, the focus adjustment calculation unit 206 converts a distance to the current virtual focus region into a distance of the target environment. The focus adjustment calculation unit 206 generates focus adjustment instruction information for providing an instruction to adjust the focus to the converted distance and transmits the information to the drone 10 through the communication unit 202. The focus control unit 109 of the drone 10 adjusts the focus of the shooting camera 101 according to the focus adjustment instruction information.

Figure 9:
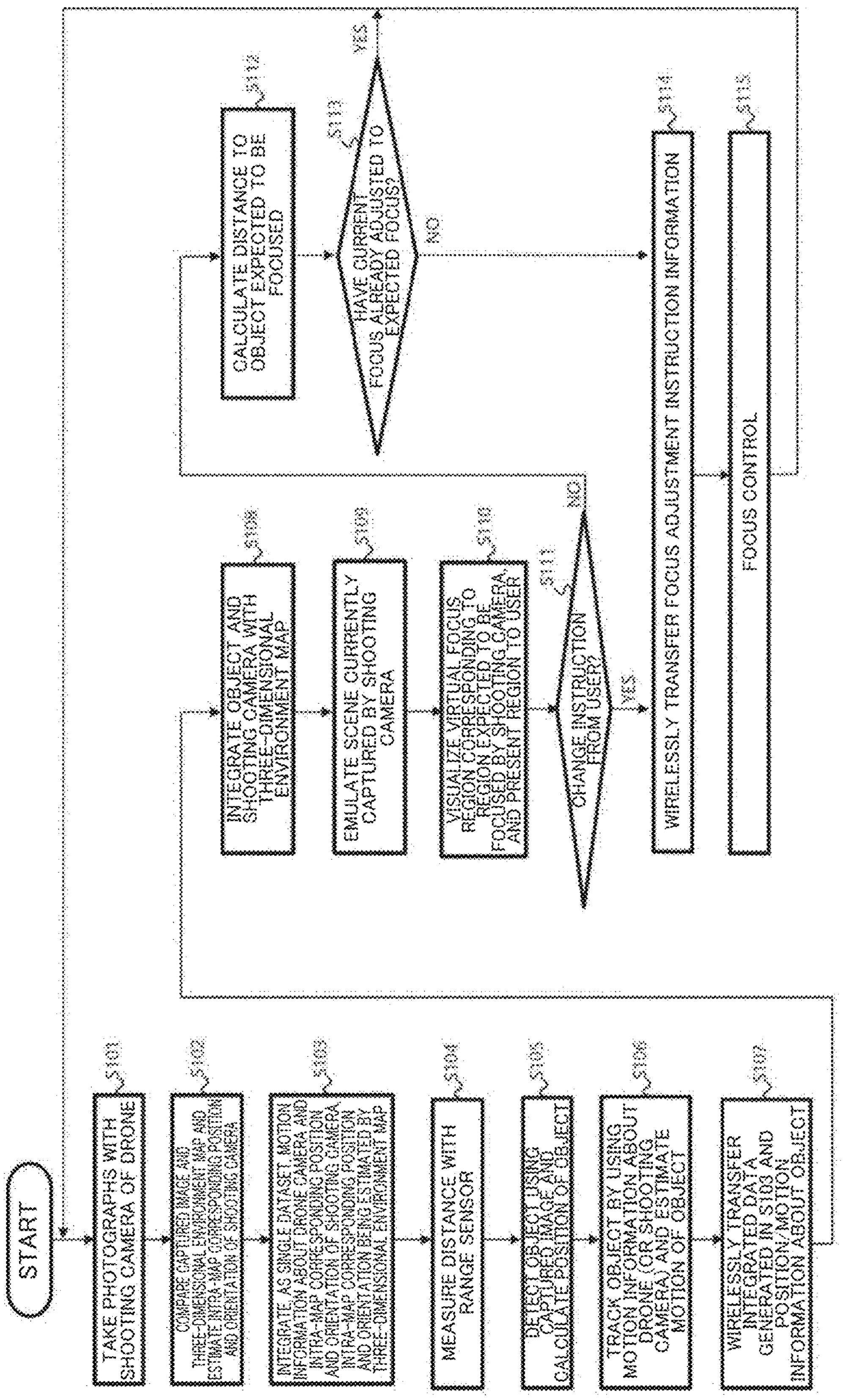
FIG. 9 is a flowchart of an operation example of the communication system according to the first embodiment.

FIG. 9 is a flowchart of an operation example of the communication system according to the first embodiment.

In step S101, the user operates the user input unit 208 of the operating device 20 to cause the drone 10 to fly (manual flight) in the target environment, and photographs the target environment with the shooting camera 101. Shooting with the shooting camera 101 is performed at, for example, a fixed frame rate. In the flight control unit 103 of the drone 10, motion information about the drone 10 and motion information about the shooting camera 101 are estimated on the basis of user operation information.

In step S102, the locating unit 105 of the drone 10 estimates a position (intra-map corresponding position) and an orientation (intra-map corresponding orientation), which correspond to the position and orientation of the shooting camera 101, in the three-dimensional environment map on the basis of image data received at regular intervals from the shooting camera 101.

In step S103, the integration unit 107 integrates the motion information about the drone 10, the motion information about the shooting camera 101, and the intra-map corresponding position and the intra-map corresponding orientation of the shooting camera 101 into a set of data, the motion data being estimated by the flight control unit 103. The motion information about the drone 10 includes at least one of position information and speed information for a period corresponding to the length of the intervals. The motion information about the shooting camera 101 includes at least one of position information and orientation information for a period corresponding to the length of the intervals.

In step S104, the range sensor 104 measures a distance in a detection range in the target environment and generates distance data including distance values to positions in the detection range. The range sensor 104 transmits the distance data to the object recognition unit 106.

In step S105, the object recognition unit 106 detects an object (target object) to be photographed, on the basis of image data from the shooting camera 101. The object recognition unit 106 calculates the position of the detected target object in the target environment on the basis of the distance data.

In step S106, the object tracking unit 108 performs tracking on the target object on the basis of motion information about at least one of the drone 10 and the shooting camera 101 from the flight control unit 103 and position information about the target object detected by the object recognition unit 106. Thus, the motion of the target object is estimated. The object tracking unit 108 estimates the motion of the target object, for example, for a period corresponding to the length of the intervals, thereby obtaining motion information about the target object.

In step S107, the communication unit 102 transmits the integrated data obtained by the integration unit 107 and the motion information and position information about the target object to the operating device 20, the motion information and position information being obtained by the object tracking unit 108.

In step S108, the three-dimensional view generation unit 204 of the operating device 20 integrates the target object and the shooting camera in the three-dimensional environment map. More specifically, the three-dimensional view generation unit 204 places a virtual camera (virtual eyepoint) with an intra-map corresponding orientation at the intra-map corresponding position of the shooting camera 101 in the three-dimensional environment map. Moreover, the field range of the virtual camera is set according to, for example, a camera parameter of the shooting camera 101. On the basis of the position information about the target object, a virtual target object corresponding to the target object is disposed in the three-dimensional environment map. In addition, when orientation information is detected in addition to position information about the target object in the target environment, the orientation of the virtual target object may also be set according to the orientation information.

In step S109, the three-dimensional view generation unit 204 generates image data in the field range of the virtual camera from the three-dimensional environment map at a fixed frame rate according to the period corresponding to the length of the intervals, and displays the generated image data on the display unit 207. In other words, the image of a scene captured by the shooting camera 101 in the target environment is emulated in the three-dimensional environment map. Specifically, the three-dimensional view generation unit 204 moves the virtual camera and the virtual target object at a fixed frame rate on the basis of the motion information about the shooting camera 101 (or the drone 10) and the motion information about the target object. Furthermore, image data at each frame rate is displayed on the display unit 207.

In step S110, in the three-dimensional environment map, the focus adjustment calculation unit 206 determines a virtual focus region corresponding to a region focused by the shooting camera 101 (a region expected to be focused by the shooting camera 101) on the basis of an image of the field range of the virtual camera. Region-specific information for specifying the virtual focus region is displayed on the display unit 207.

In step S111, the focus adjustment calculation unit 206 determines whether an instruction to change the virtual focus region is input from the user input unit 208. If an instruction to change the focus region is input (YES at S111), the focus adjustment calculation unit 206 calculates a distance to the virtual focus region changed in response to a user instruction, and converts the calculated distance to a distance of the target environment. The distance to the virtual focus region may be a mean distance to the virtual focus region, a mean distance to the virtual target object included in the virtual focus region, or a distance to the position (e.g., the center of gravity) of the virtual target object. Alternatively, the distance may be a distance to the center of gravity or any specific position in the virtual focus region or a distance determined by other methods.

In step S114, the focus adjustment calculation unit 206 generates focus adjustment instruction information for providing an instruction to adjust the focus to the converted distance and transmits the information to the drone 10 through the communication unit 202.

In step S115, the focus control unit 109 of the drone 10 adjusts the focus of the shooting camera 101 by adjusting a camera parameter such as the focal distance of the shooting camera 101 according to the focus adjustment instruction information.

In the absence of a user input for a change instruction of the focus region (NO at S111), the focus adjustment calculation unit 206 converts a distance to the current virtual focus region into a distance in the target environment in step S112.

In step S113, when the converted distance is equal to the previously converted distance, the focus adjustment calculation unit 206 determines that the focus has been already adjusted to a region expected to be focused by the shooting camera 101 (YES at S113), and the process returns to step S101.

When the converted distance is different from the previously converted distance, the focus adjustment calculation unit 206 determines that the focus has not been adjusted to a region expected to be focused by the shooting camera 101 (NO at S113). Since the previously converted distance is unknown in the first processing of the flowchart, it may be unconditionally determined that the focus has not been adjusted in step S113. The focus adjustment calculation unit 206 generates focus adjustment instruction information for providing an instruction to adjust the focus to the converted distance and transmits the information to the drone 10 through the communication unit 202.

As described above, according to the present embodiment, a region focused by the shooting camera (a region expected to be focused) can be recognized by the user as a virtual focus region in the three-dimensional environment map. If the virtual focus region is different from a region expected by the user, the user can change a region to be focused by the shooting camera 101 to a desired region in the target environment by changing the virtual focus region on the basis of an input. In other words, the user can adjust the focus region of the shooting camera while recognizing a state (current scene or composition) in the field angle of the shooting camera in the three-dimensional environment map. Specifically, by using the three-dimensional environment map, even in a state in which real-time video (live video shooting) captured by the shooting camera of the drone cannot be confirmed, a scene in the field angle of the shooting camera is reconstructed on the basis of the position of the drone, thereby adjusting a region to be focused by the camera. Thus, the user can operate the drone to photograph high-quality video while adjusting the focus to a desired region.

Second Embodiment

In the present embodiment, the position and orientation of a shooting camera 101 at a future time and the position and orientation of a target object at the future time are calculated by predicting the further motion of the shooting camera 101 and the future motion of the target object. The position and orientation of a virtual camera are changed according to the predicted position and predicted orientation of the shooting camera 101, and the position and orientation of a virtual target object are changed according to the predicted position and predicted orientation of the target object. An image of the field range of the virtual camera at the changed position is displayed on a display unit 207. A virtual focus region (a virtual focus region at a future time) is specified in an image in the field range of the virtual camera, and region-specific information is displayed in association with (or superimposed on) the focus region. Thus, a user is allowed to previously make visual confirmation of a region expected to be focused by the shooting camera 101 in the future. Furthermore, as in the first embodiment, the user can change a virtual focus region at a future time to a desired position. In other words, the user can previously specify a region expected to be focused by the shooting camera 101 before a future time. Thus, high-quality video can be captured while the focus is adjusted to a desired region. The present embodiment will be described in detail below.

Figure 10:
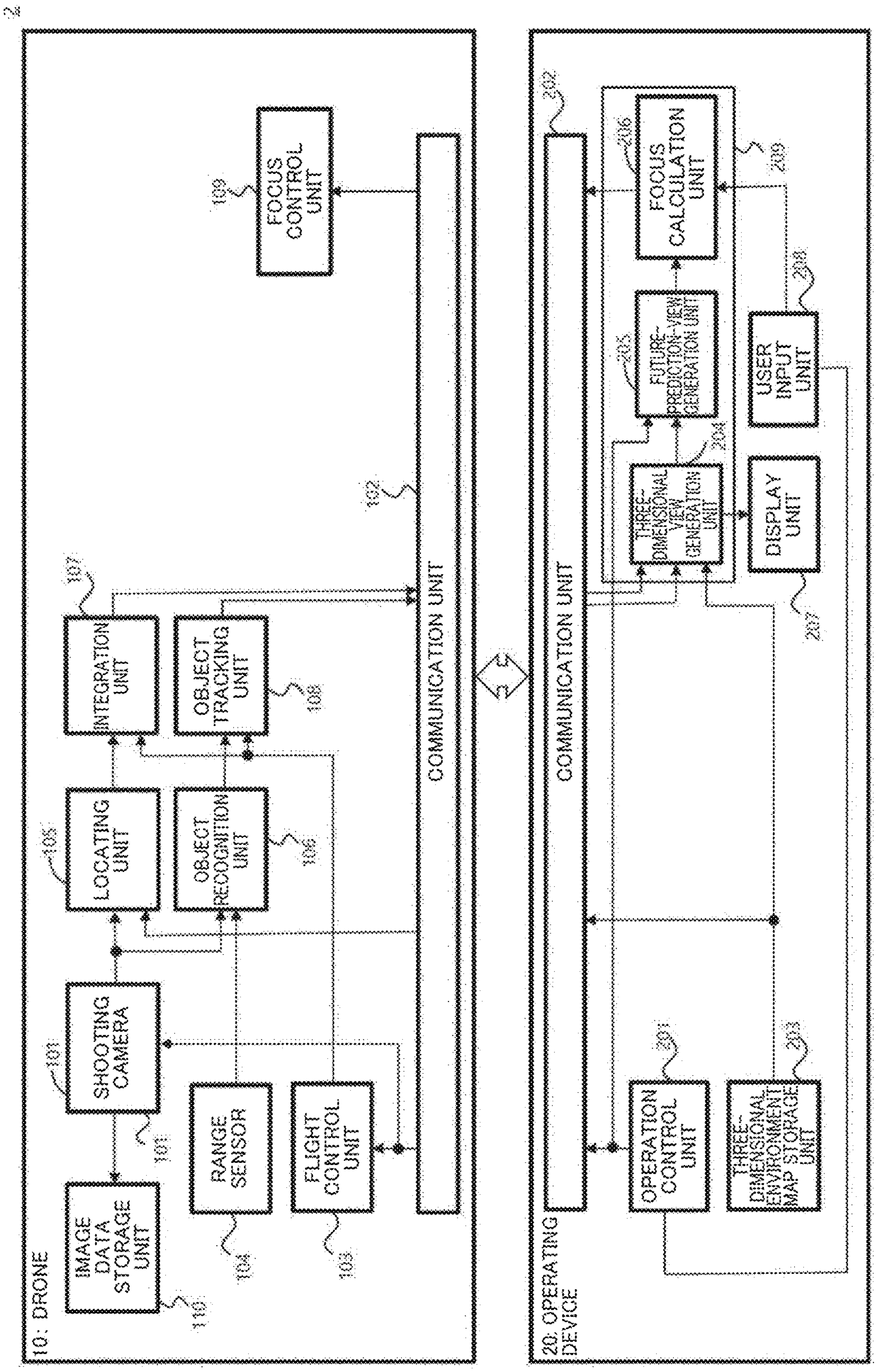
FIG. 10 illustrates a communication system according to a second embodiment.

FIG. 10 illustrates a communication system 2 according to a second embodiment of the present disclosure. A future-prediction-view generation unit 205 is added to a processing unit 209 in an operating device 20. The same reference signs are assigned to elements having the same names as those illustrated in FIG. 2, and detailed descriptions are omitted as appropriate except for changed or extended processing.

The future-prediction-view generation unit 205 predicts the position and orientation of the shooting camera 101 at a certain future time on the basis of motion information about the shooting camera 101. For example, the future-prediction-view generation unit 205 receives operation information (instruction information for a drone 10) output from an operation control unit 201 and predicts the position and orientation of the shooting camera 101 at a certain future time. Alternatively, the future-prediction-view generation unit 205 may predict the position and orientation of the shooting camera 101 after a certain time on the basis of the history of movements of the drone 10 or the shooting camera 101. A three-dimensional view generation unit 204 may include a holding unit that holds the history of movements of the drone 10 or the shooting camera 101. The history of movements may be produced on the basis of operation information or motion information about the drone 10 or the shooting camera 101, the motion information being received from the drone 10. In this configuration, the position and orientation of the shooting camera 101 are predicted. Only the position of the shooting camera 101 may be predicted. In this case, the orientation of the shooting camera 101 may be fixed in advance.

The future-prediction-view generation unit 205 determines the position and orientation of the virtual camera on the basis of the predicted position and orientation of the shooting camera 101. For example, the position and orientation of the virtual camera are changed in a three-dimensional environment map according to a difference between the position and orientation before prediction and the position and orientation after prediction.

The future-prediction-view generation unit 205 predicts the motion of a target object on the basis of motion information (e.g., the history of the positions of the target object) about the target object to be photographed by the shooting camera 101 in a target environment. The future-prediction-view generation unit 205 predicts at least one of the position and orientation of the target object at a certain future time. The future-prediction-view generation unit 205 moves a virtual target object in the three-dimensional environment map according to the predicted position and orientation of the target object. In other words, the position and orientation of the virtual target object are changed. In this configuration, the position and orientation of the target object are predicted. Only the position of the target object may be predicted.

Figure 11:
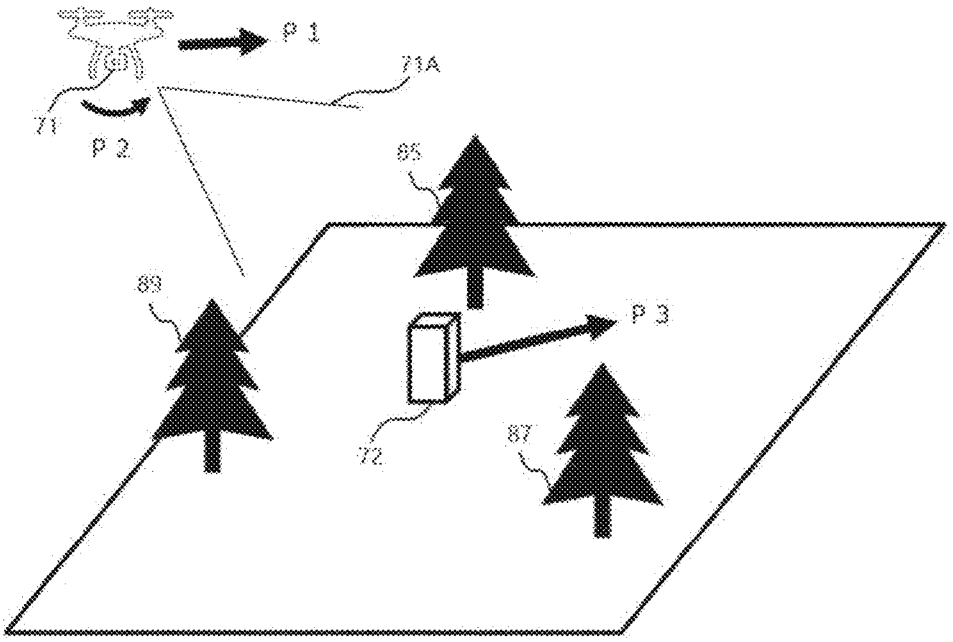
FIG. 11 schematically illustrates an example in which a virtual camera and a virtual target object are moved to predicted positions in a three-dimensional environment map.

FIG. 11 schematically illustrates an example in which a virtual camera 71 and a virtual target object 72 are moved to predicted positions in a three-dimensional environment map 70. The position of the shooting camera 101 at a future time is predicted, and the virtual camera 71 is moved to a position (second position), which corresponds to the predicted position, in the three-dimensional environment map 70 (processing P1). The orientation of the shooting camera 101 at the future time is predicted, and the virtual camera 71 is oriented according to the predicted orientation (processing P2). The position and orientation of the virtual camera 71 in the three-dimensional environment map 70 correspond to the second position and a second orientation for placing the virtual camera 71 while corresponding to the predicted position and orientation of the shooting camera 101. The motion of the target object in the target environment is predicted, and the virtual target object 72 in the three-dimensional environment map 70 is moved or reoriented according to the predicted position and orientation (processing P3).

The future-prediction-view generation unit 205 displays, on the display unit 207, an image of the field range of the virtual camera 71 at the position and orientation of the future time.

Figure 12:
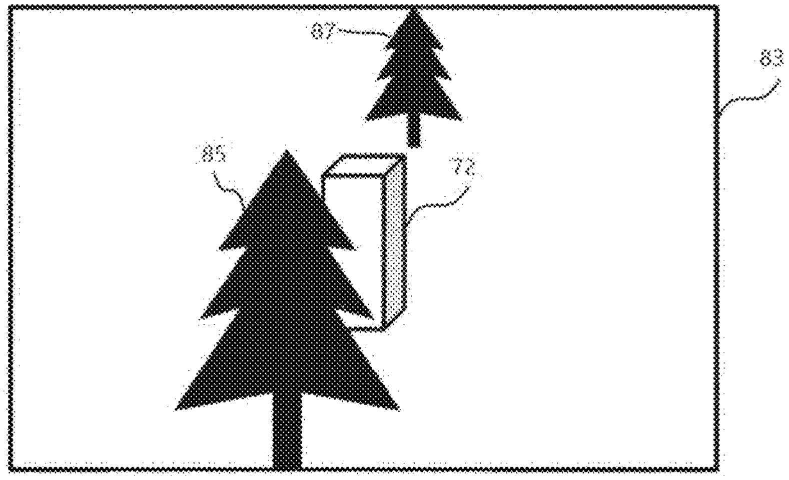
FIG. 12 illustrates a display example indicating an image of the field range of the virtual camera at a future time.

FIG. 12 illustrates a display example indicating an image 83 of the field range of the virtual camera at a certain future time when an image of the field range of the virtual camera at the current time is the image 80 shown in FIG. 7. The display unit 207 displays the image 83 that is an image of the field range of the virtual camera at the future time. The image 83 at the current time and the image 80 at the future time may be displayed at the same time or in a switched manner on the display unit 207.

The future-prediction-view generation unit 205 determines a virtual focus region in an image of the field range of the virtual camera at the future time. The future-prediction-view generation unit 205 selects an object (virtual object) according to a second selection condition in an image in the field range of the virtual camera at the future time, and determines a region including the selected object as a virtual focus region.

The second selection condition may include at least one of the following conditions:

Condition for selecting a moving object from at least one object

Condition for selecting, from at least one object, an object having the largest area included in the second region range in the image Condition for selecting, from at least one object, an object included in a second distance range from the virtual camera Condition for selecting an object specified by the user from at least one object The future-prediction-view generation unit 205 places region-specific information in association with the determined virtual focus region. For example, the region-specific information is superimposed on the virtual focus region.

Figure 13:
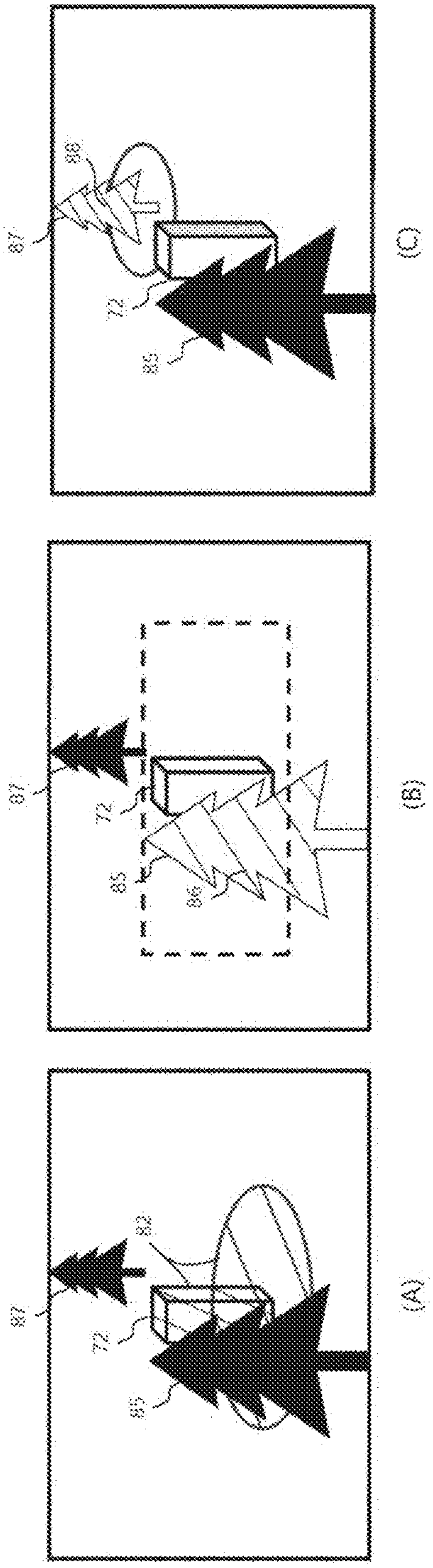
FIG. 13 illustrates examples of a method for determining a virtual focus region.

Referring to FIG. 13, a specific example of a method for determining the virtual focus region according to the second selection condition will be described below.

FIG. 13 illustrates examples of the method for determining the virtual focus region.

FIG. 13(A) shows an example in which the determined virtual focus region is a region including an object (virtual target object 72) moving as a tracking target in an image of the field range of the virtual camera at the future time. Region-specific information 82 indicated by diagonal lines is displayed to be superimposed on the determined virtual focus region.

FIG. 13(B) shows an example in which an object is selected from one or more objects included in a region having a predetermined shape in an image of the virtual camera at the future time and the region of the selected object is determined as a virtual focus region. More specifically, from among objects at least partially included in a rectangular region 84 including the center of the image, an object having the largest area in a part included in the region 84 is selected. In the present example, a virtual object 85 different from the virtual target object 72 is selected. The virtual focus region is set on the selected virtual object 85. Region-specific information 86 indicated by diagonal lines is displayed to be superimposed on the determined virtual focus region.

FIG. 13(C) shows an example in which the region of a virtual object specified from a user input unit 208 is set as a virtual focus region. By using the user input unit 208, the user specifies a virtual object to be focused in an image displayed on the display unit 207. In the present example, a virtual object 87 is specified, and a virtual focus region is set on the virtual object 87. Region-specific information 88 indicated by diagonal lines is displayed to be superimposed on the determined virtual focus region.

The method to be used as the second selection condition may be selected from the user input unit 208 by the user. One of the methods is determined in advance as a default option. The default method may be applied unless the user selects otherwise.

The method shown in FIG. 13 is merely exemplary, and a virtual focus region may be set by other methods. For example, the user may specify a virtual focus region in advance at a predetermined point in the three-dimensional environment map. In this case, when an image of the field range of the virtual camera is displayed on the display unit 207, a previously specified point is determined as a virtual focus region in the displayed image. Alternatively, programming may be performed to change the virtual focus region in advance by simulation in response to the drone 10 (shooting camera 101) in the target environment (see a third embodiment described later).

A focus adjustment calculation unit 206 calculates a distance to the virtual focus region determined by the future-prediction-view generation unit 205 at the future time. The distance may be calculated by the same method as that of the first embodiment. The focus adjustment calculation unit 206 converts the calculated distance into a distance of the target environment. The focus adjustment calculation unit 206 generates focus adjustment instruction information to provide an instruction to adjust the focus to the converted distance at a certain future time (after a first time), and transmits the information to the drone 10 through a communication unit 202. A focus control unit 109 of the drone 10 adjusts the focus of the shooting camera 101 at the time of the arrival of the certain future time according to the focus adjustment instruction information. For example, a camera parameter such as the focal distance of the shooting camera 101 is adjusted to achieve focus at a distance specified in the focus adjustment instruction information. As described above, the focal point of the shooting camera 101 can be controlled to adjust the focus to a region expected to be focused by the shooting camera 101 at the future time.

Figure 14:
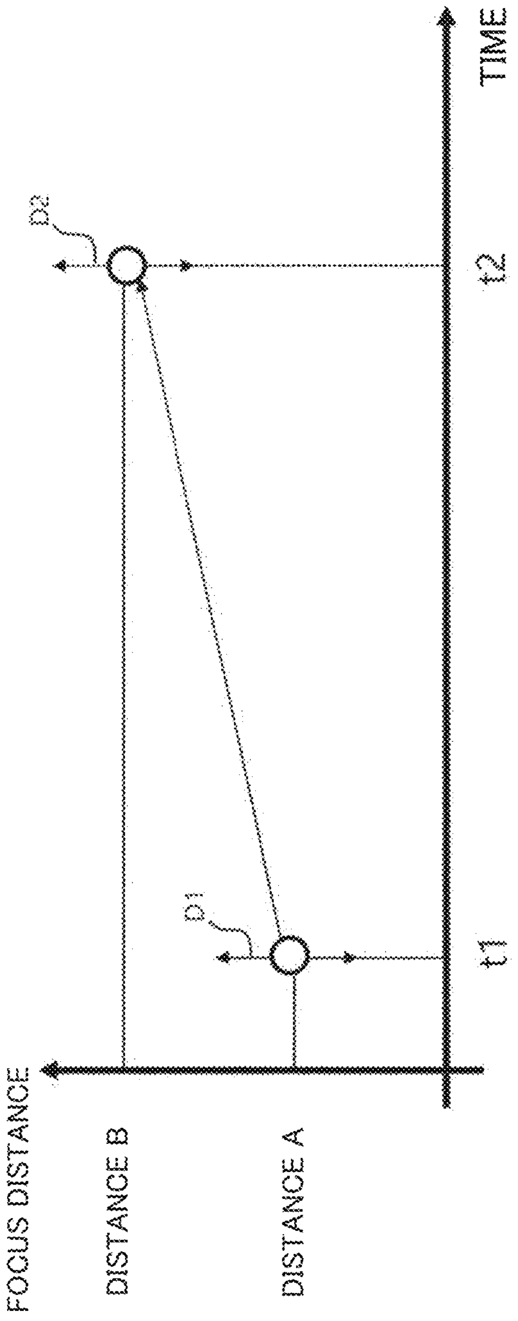
FIG. 14 is an explanatory drawing showing exemplary control of the focal point of a shooting camera.

FIG. 14 is an explanatory drawing showing exemplary control of the focal point of the shooting camera 101. A distance A denotes a distance (a distance in the target environment) where focus is achieved by the shooting camera 101 at a current time t1. Moreover, the focal distance of a lens and a depth of field D1 are set with respect to the position of the distance A.

The depth of field is a range that includes a range around the focal distance of the lens and is assumed to be in focus. The depth of field is determined by a combination of an f number (F value) of a lens, a focal distance of a lens, and a shooting distance (a distance between an object to be photographed and the shooting camera). For example, the depth of field can be adjusted by the f number of a lens in a certain shooting environment. The smaller the f number, the smaller the depth of field, whereas the larger the f number, the larger the depth of field.

When the focus adjustment calculation unit 206 instructs the focus control unit 109 to adjust the focus to a distance B at a future time t2, a camera parameter is adjusted to achieve focus at the distance B at the time t2. For example, camera parameters including at least one of a focal distance and a f number are adjusted such that the distance B is adjusted to the center of a depth of field D2 or the distance B is included at least in the range of the depth of field D2.

As a specific example, it is assumed that the image of the display unit 207 at the current time t1 is the image 80 of FIG. 8 and a virtual focus region is set on the virtual object 87 in the image 83 of FIG. 12 at the future time t2. At the future time t2, the focal distance or the like of the lens of the shooting camera 101 is adjusted according to the distance B. For example, the adjustment is made such that the distance B corresponds to the center of the depth of field. Thus, it is expected that the focus of the shooting camera 101 is adjusted to an object in the target environment, the object corresponding to the virtual object 87 in the three-dimensional environment map.

Figure 15:
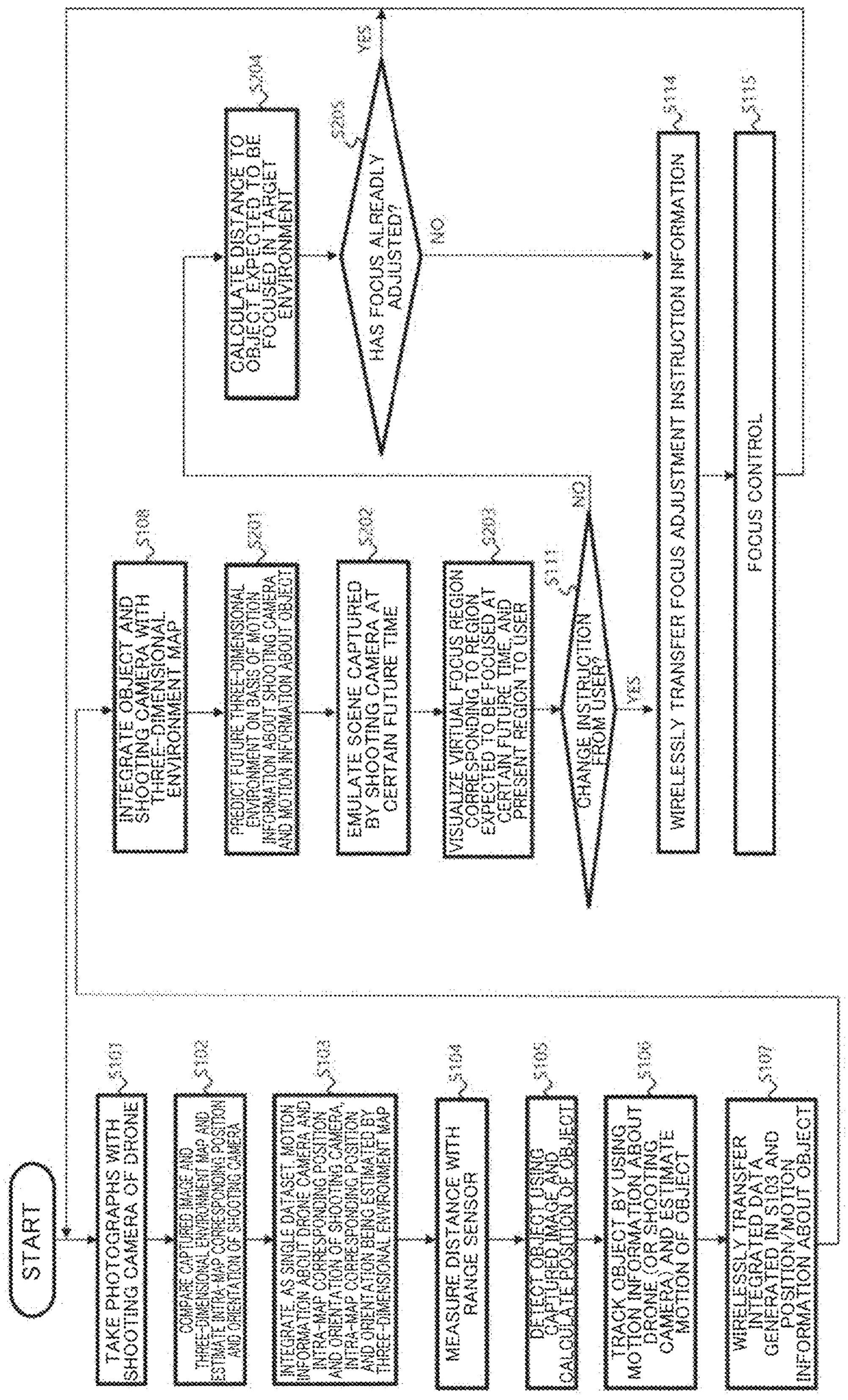
FIG. 15 is a flowchart of an operation example of the communication system according to the second embodiment.

FIG. 15 is a flowchart of an operation example of a communication system according to the second embodiment. Since steps S101 to S108, S114, and S115 are identical to those in the flowchart of FIG. 9, the descriptions thereof are omitted.

In step S201, the future-prediction-view generation unit 205 predicts a future three-dimensional environment on the basis of motion information about the shooting camera 101 (or drone 10) and motion information about the target object. For example, the future-prediction-view generation unit 205 predicts the position and orientation of the shooting camera 101 at a future time after a certain time (one hour later) on the basis of operation information output from the operation control unit 201 or the history of movements of the shooting camera 101. The future-prediction-view generation unit 205 predicts the motion of the target object on the basis of motion information about the target object to be photographed by the shooting camera 101 in the target environment, and predicts the position and orientation of the target object at the certain future time.

In step S202, the future-prediction-view generation unit 205 emulates an image of a scene captured by the shooting camera 101 at the certain future time. More specifically, the future-prediction-view generation unit 205 changes the position and orientation of the virtual camera in the three-dimensional environment map according to the predicted position and orientation of the shooting camera 101 in step S201. The position and orientation of the virtual target object in the three-dimensional environment map are changed according to the predicted position and orientation of the target object in step S201. The future-prediction-view generation unit 205 displays, on the display unit 207, an image of the field range of the virtual camera 71 after the change in the three-dimensional environment map.

In step S203, the future-prediction-view generation unit 205 determines a virtual focus region at the certain future time and visualizes the virtual focus region. In other words, region-specific information is superimposed on the virtual focus region. For example, the virtual focus region is set in a region including a virtual object selected according to the second selection condition (see FIGS. 13(A) to 13(C)).

In step S111, the focus adjustment calculation unit 206 determines whether an instruction to change the virtual focus region at a future time is input from the user input unit 208. If an instruction to change the focus region is input (YES at S111), the process advances to step S114, and focus adjustment instruction information about an instruction to adjust the focus to a calculated distance is transmitted to the drone 10. In step S115, the focus control unit 109 of the drone 10 adjusts the position or region of the focus of the shooting camera 101 according to the focus adjustment instruction information.

In the absence of a user input for a change instruction of the focus region (NO at S111), in step S204, the focus adjustment calculation unit 206 calculates a distance to a region expected to be brought into focus at a future time in the target environment. In other words, a distance to the predicted virtual focus region in the three-dimensional environment map is converted into a distance of the target environment.

In step S205, the focus adjustment calculation unit 206 determines whether a region expected to be brought into focus has been already in focus. If a region expected to be brought into focus has been already in focus (YES at S205), the process returns to step S101.

If the focus adjustment calculation unit 206 determines that a region expected to be brought into focus has been out of focus (NO at S205), the process advances to step S114. In step S114, focus adjustment instruction information that specifies the adjustment of the focus to the distance calculated in step S204 is transmitted to the drone 10. In step S115, the focus control unit 109 of the drone 10 adjusts the position or region of the focus of the shooting camera 101 according to the focus adjustment instruction information.

Thus, according to the present embodiment, a region expected to be focused by the shooting camera at a certain future time can be predicted in advance by the user as a virtual focus region in the three-dimensional environment map. If the virtual focus region is different from a region expected by the user, the user previously changes the virtual focus region at a future time, thereby adjusting the focus of the shooting camera to an expected region at the future time. In other words, for a quick motion of the drone or the shooting camera, a region focused by the shooting camera is allowed to follow an object to be photographed. This can reduce the frequency of retake and failed shooting.

Third Embodiment

Figure 16:
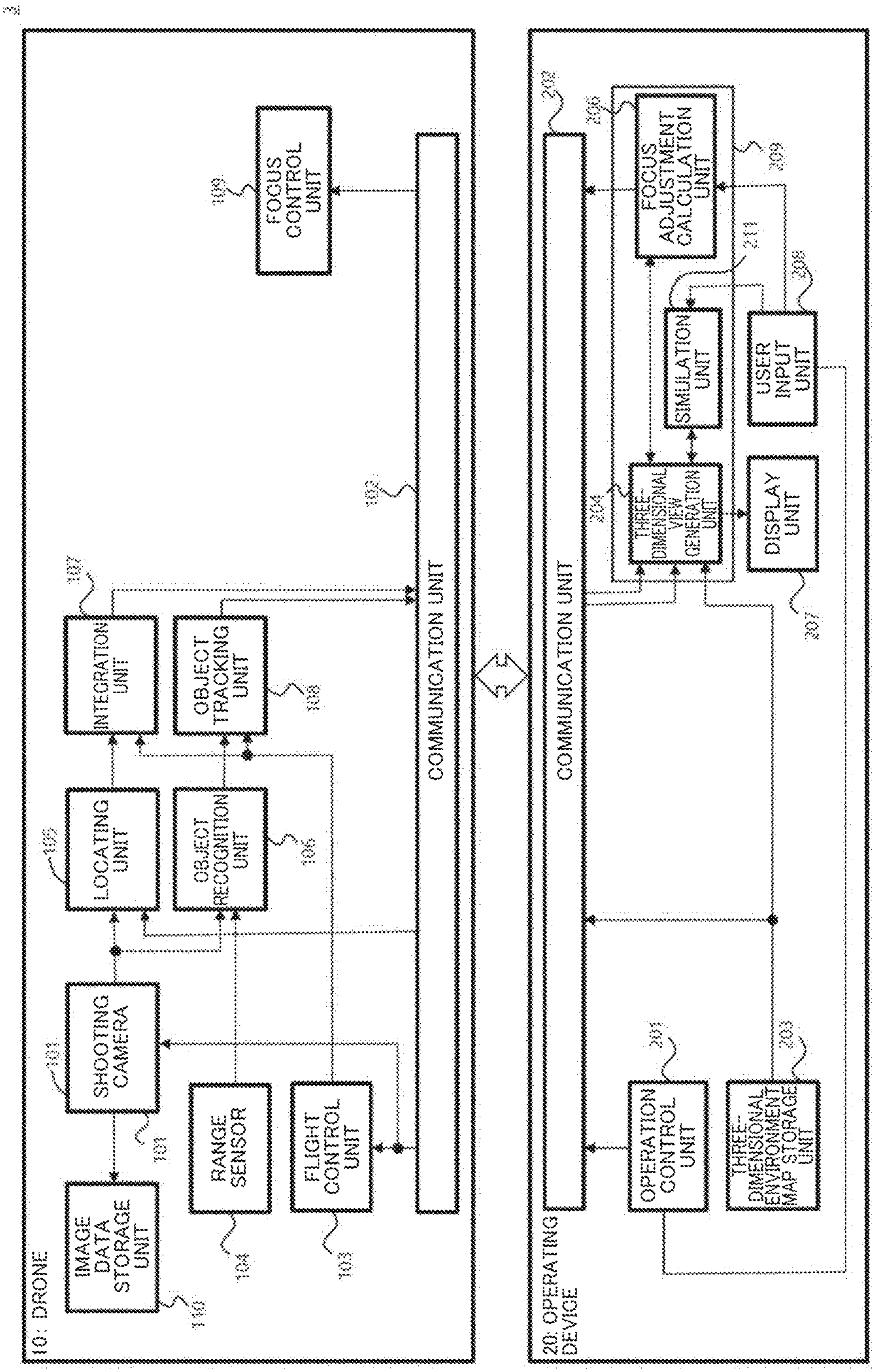
FIG. 16 illustrates a communication system according to a third embodiment.

FIG. 16 illustrates a communication system 3 according to a third embodiment of the present disclosure. A simulation unit 211 is added to a processing unit 209 in an operating device 20. Moreover, a drone 10 according to the present embodiment makes autonomous flight according to a specified route. The same reference signs are assigned to elements having the same names as those illustrated in FIG. 2, and detailed descriptions are omitted as appropriate except for changed or extended processing.

The simulation unit 211 prepares simulation and performs simulation processing.

In the preparation of simulation, a route (virtual flight path) for moving a virtual drone provided with a virtual camera is determined in a three-dimensional environment map. Furthermore, the orientation of the virtual camera at each point (way point) along a virtual flight path and the region of an object (target object) to be focused are determined. The target object is, for example, an object to be inspected.

Figure 17:
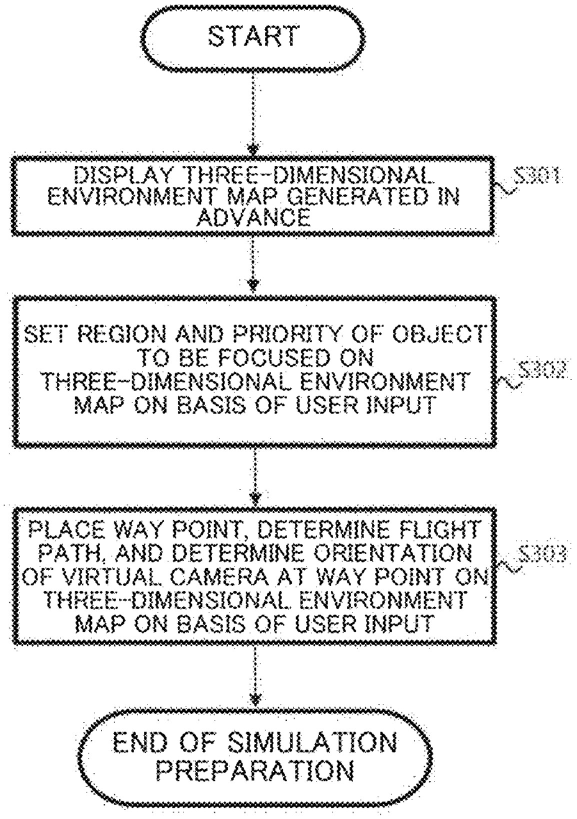
FIG. 17 is a flowchart showing an example of preparation processing performed by a simulation unit.

FIG. 17 is a flowchart showing an example of preparation processing performed by the simulation unit 211. A three-dimensional environment map generated in advance is displayed on a display unit 207 (S301). On the basis of a user input from a user input unit 208, the simulation unit 211 determines the region of a target object to be focused (S302). The user sets the priority of the target object (step S302). By setting of the priority, a target object to be preferentially focused can be selected when a plurality of target objects are present in a screen. The simulation unit 211 sets a plurality of way points in the three-dimensional environment map on the basis of a user input, so that a virtual flight path is generated for the flight of a virtual drone. Moreover, the orientation of a virtual camera is determined at each of the way points (S303). The simulation unit 211 stores information determined in steps S302 and S303. A route for moving the virtual camera may be used instead of the route for moving the virtual drone.

Figure 18:
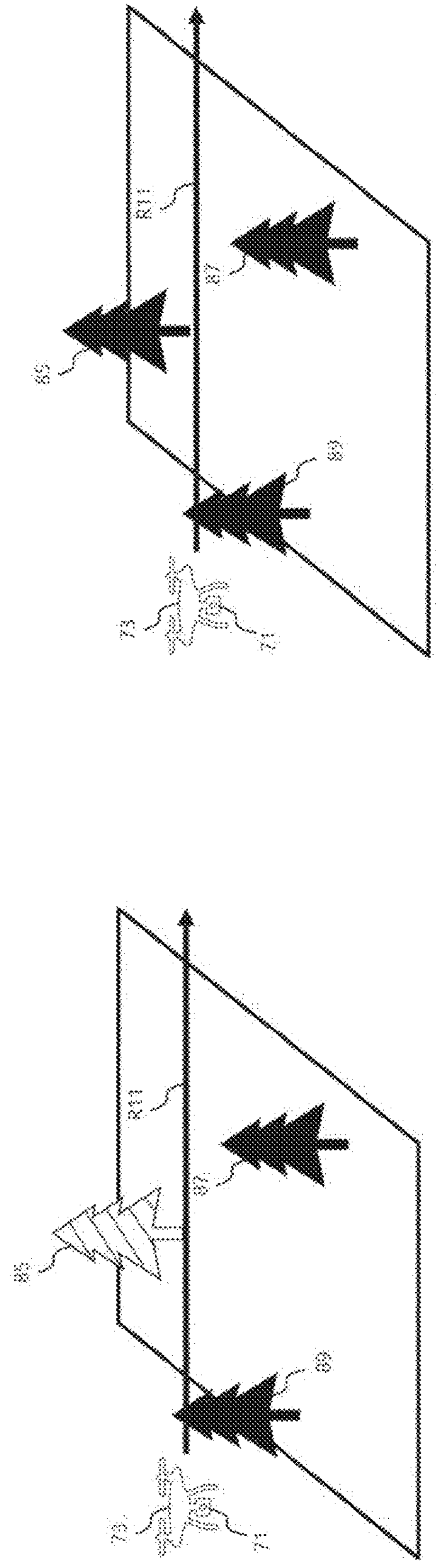
FIG. 18 is an explanatory drawing showing an example of preprocessing performed by the simulation unit.

FIG. 18(A) is an explanatory drawing showing an example of preprocessing of the simulation unit 211. A virtual drone 73 provided with a virtual camera 71 is shown in a three-dimensional environment map 70. A virtual flight path R11 as a route for moving the virtual drone 73 is set on the basis of a user input. Moreover, a virtual object 85 is specified as a target object brought into focus.

The simulation unit 211 performs simulation for moving the virtual drone in the three-dimensional environment map according to the virtual flight path.

FIG. 18(B) shows an example of simulation for moving the virtual drone 73 along the virtual flight path R11.

Figure 19:
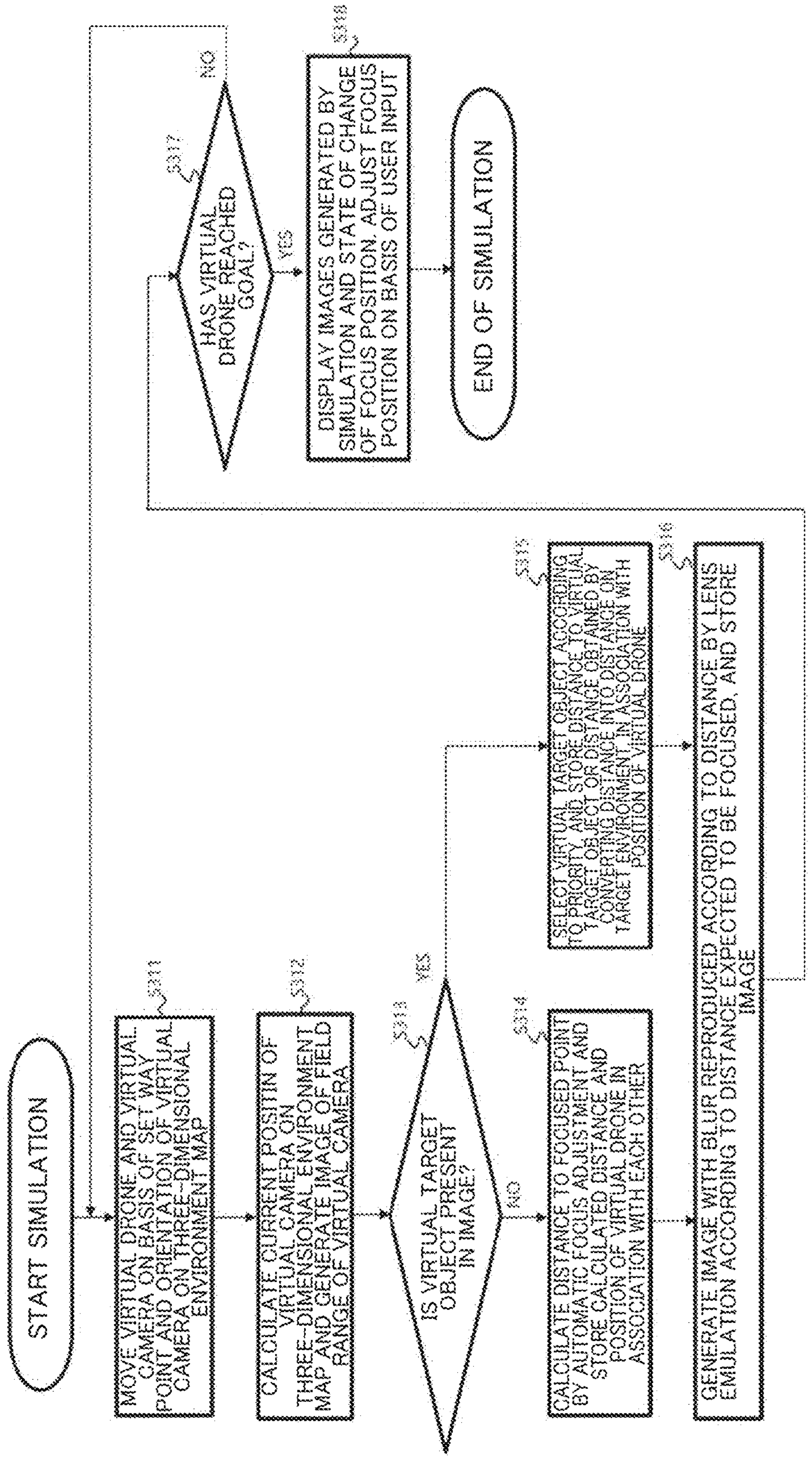
FIG. 19 is a flowchart showing an example of simulation performed by the simulation unit.

FIG. 19 is a flowchart showing an example of simulation performed by the simulation unit 211. In the three-dimensional environment map, the virtual drone 73 provided with the virtual camera 71 is moved on the basis of the way points set in the preparation and the orientation of the virtual camera (S311).

The simulation unit 211 determines a virtual focus region at each position (way point) of the virtual drone moving along the virtual flight path. More specifically, the current position of the virtual camera is first calculated in the three-dimensional environment map, and an image of the field range of the virtual camera is generated (S312). A virtual target object is detected in the generated image (S313). It is assumed that the virtual target object of the present example is a specific object (static object) placed in advance in the three-dimensional environment map.

When detecting the virtual target object (YES), the simulation unit 211 determines the region of the virtual target object as a virtual focus region. The simulation unit 211 calculates a distance to the virtual focus region (S315). The distance corresponds to a distance where the virtual camera is focused to the virtual focus region in the three-dimensional environment map. The simulation unit 211 converts the calculated distance into a distance (distance to a target object) in a target environment. The simulation unit 211 stores at least one of the distance to the virtual focus region and the converted distance as correspondence information in association with the position of the virtual drone (step S315). The correspondence information is an example of information obtained by associating information about the virtual focus region with the position of the virtual drone. In the correspondence information, the distance may be replaced with information that specifies the position or range of the virtual focus region. In the presence of multiple virtual target objects, for example, the virtual target object with the highest priority is selected, and the region of the selected virtual target object is determined as a virtual focus region (step S315). Alternatively, the virtual target objects are assigned with weights according to the priority levels. Distances to the virtual target objects are assigned with weights according to the priority levels, and the mean of the distances assigned with the weights is determined as a distance to the virtual focus region (step S315).

When a virtual target object is not detected (NO), the simulation unit 211 calculates a distance for focus adjustment according a predetermined method (S314). For example, a virtual object having the largest area in a part included in a region including the center in a screen or a virtual object closest to the virtual camera is selected according to any method. The virtual object may be selected by the same method as in the first selection condition or the second selection condition. The simulation unit 211 determines, as a virtual focus region, a region including the selected virtual object and calculates a distance to the virtual focus region. The simulation unit 211 stores at least one of the distance to the virtual focus region and a distance obtained by converting the distance into a distance on the target environment as correspondence information in association with the position of the virtual drone (step S314).

The simulation unit 211 generates an image with a reproduced blur by lens emulation at the current position and orientation of the virtual camera according to the distance calculated in step S314 or step S315 (S316). In other words, in the image generated in step S312, an image is adjusted with a larger amount of blurring for a region deviated from the distance calculated in step S314 or step S315. The simulation unit 211 stores the generated image for user confirmation in a storage unit accessible to the simulation unit 211. The storage unit may be provided inside the operating device 20 or outside the operating device 20.

The simulation unit 211 determines whether the virtual drone has reached the goal of the virtual flight path (S317). If the virtual drone has not reached the goal (NO), the process returns to step S311.

If the virtual drone has reached the goal of the virtual flight path (YES), the image stored in step S316 is reproduced, and the reproduced image is displayed on the display unit 207 to allow the user to confirm the image (S318). Moreover, the correspondence information is displayed in a graph form that makes a transition with time on the display unit 207. The reproduced image and the correspondence information may be displayed with time synchronization.

Figure 20:
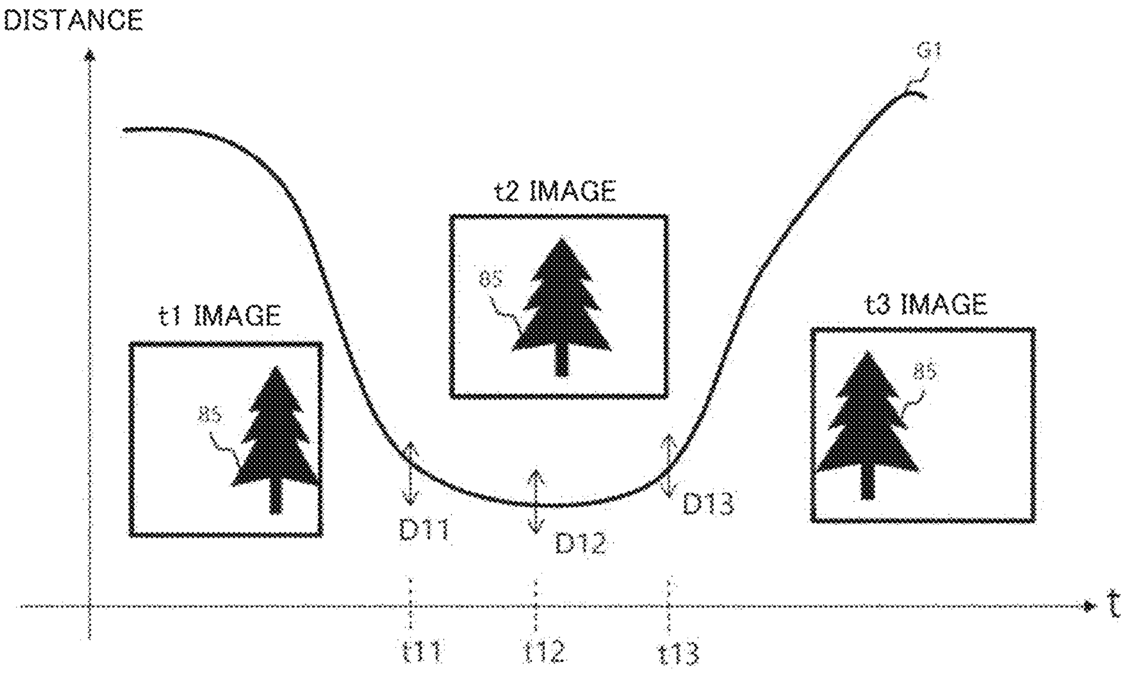
FIG. 20 illustrates a display example of a reproduced image and correspondence information with time synchronization.

FIG. 20 shows an example in which reproduced images and correspondence information are displayed with time synchronization. A distance graph G1 is displayed in a coordinate system with the horizontal axis indicating a time and the vertical axis indicating a distance. When a cursor is put on a position on the graph G1, the corresponding image (blurred image) is displayed. At this point, the position of the virtual camera may be simultaneously displayed. The user can confirm a distance (a distance to the virtual focus region in the present example or a converted distance) at the same time as an image with a reproduced blur at each time. FIG. 20 shows images with reproduced blurs at times t1, t2, and t3 and distances. In the present example, depth of fields D11, D12, and D13 are also indicated at the respective times. When the user finds an image with a virtual focus region to be adjusted while viewing the images with reproduced blurs, the user may input an instruction to change the virtual focus region (an instruction to adjust a distance to the virtual focus region) for the image. The instruction to change the virtual focus region may be an instruction to specify a virtual object to be focused or directly specify a distance to the virtual focus region. The simulation unit 211 updates information about the corresponding virtual focus region in the correspondence information, more specifically, a distance to the virtual focus region on the basis of an instruction input from the user.

The drone 10 acquires information about a flight path, which corresponds to the virtual flight path, in the target environment and information about the orientation of the shooting camera 101 at positions in the target environment, the positions corresponding to positions (way points) on the virtual flight path. The drone 10 flies autonomously and takes photographs on the basis of the acquired information.

The flight path (path for autonomous flight) in the target environment is expressed by a set of positions corresponding to way points on the virtual flight path. The flight path for autonomous flight is calculated from the virtual flight path by the simulation unit 211 and is transmitted to a flight control unit 103 of the drone 10 from an operation control unit 201 of the operating device 20. Moreover, information about the orientation of the shooting camera 101 is transmitted to the flight control unit 103 of the drone 10 from the operation control unit 201 of the operating device 20, the orientation corresponding to the orientation of the virtual camera at each way point. The flight control unit 103 flies along the autonomous flight path and takes photographs with the shooting camera 101 on the basis of the path for autonomous flight and information about the orientation of the shooting camera 101.

Figure 21:
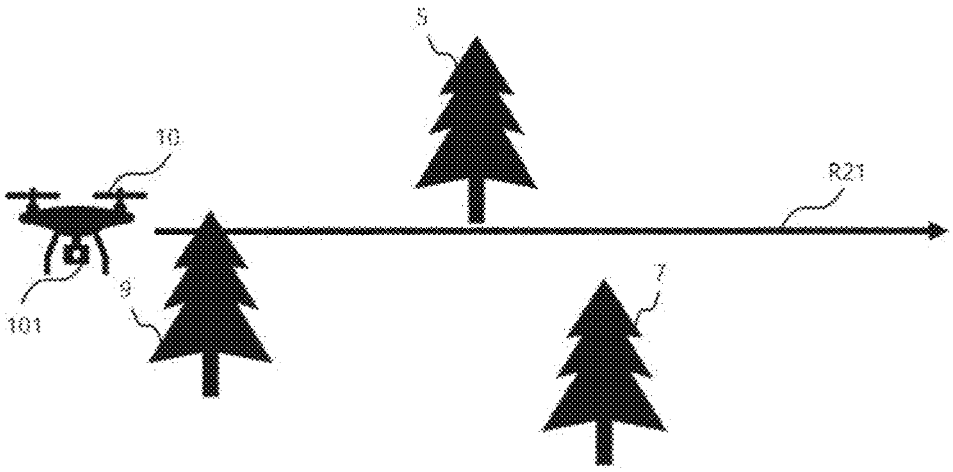
FIG. 21 shows a state in which a drone flies along an autonomous flight path and takes photographs.

FIG. 21 shows a state in which the drone 10 flies along an autonomous flight path 21 and the shooting camera 101 takes photographs in the target environment. The actual flight path of the drone 10 may be considerably deviated from the autonomous flight path due to the influence of wind or the like. Whether the path is considerably deviated may be determined by using, for example, a method for determining whether two paths are separated with a large distance through a neural network. In the case of a large deviation from the autonomous flight path, focus control may be performed using object selection according to the first selection condition or the second selection condition.

The operating device 20 acquires information about the intra-map corresponding position or the like of at least one of the drone 10 and the shooting camera 101 from an integration unit 107 of the drone 10. A focus adjustment calculation unit 206 specifies a position at or close to the acquired intra-map corresponding position on the basis of the correspondence information acquired in advance by the simulation unit 211, and acquires a distance (a distance to the virtual focus region) corresponding to the specified position. The position close to the intra-map corresponding position is, for example, the closest position to the intra-map corresponding position or a position at a distance equal to or smaller than a threshold value. The focus adjustment calculation unit 206 converts the acquired distance to the virtual focus region into a distance on the target environment, generates focus adjustment instruction information on the basis of the converted distance, and transmits the information to the drone 10. A focus control unit 109 of the drone 10 adjusts the focus of the shooting camera 101 to a distance indicated by the focus adjustment instruction information by adjusting a camera parameter of the shooting camera 101.

Figure 22:
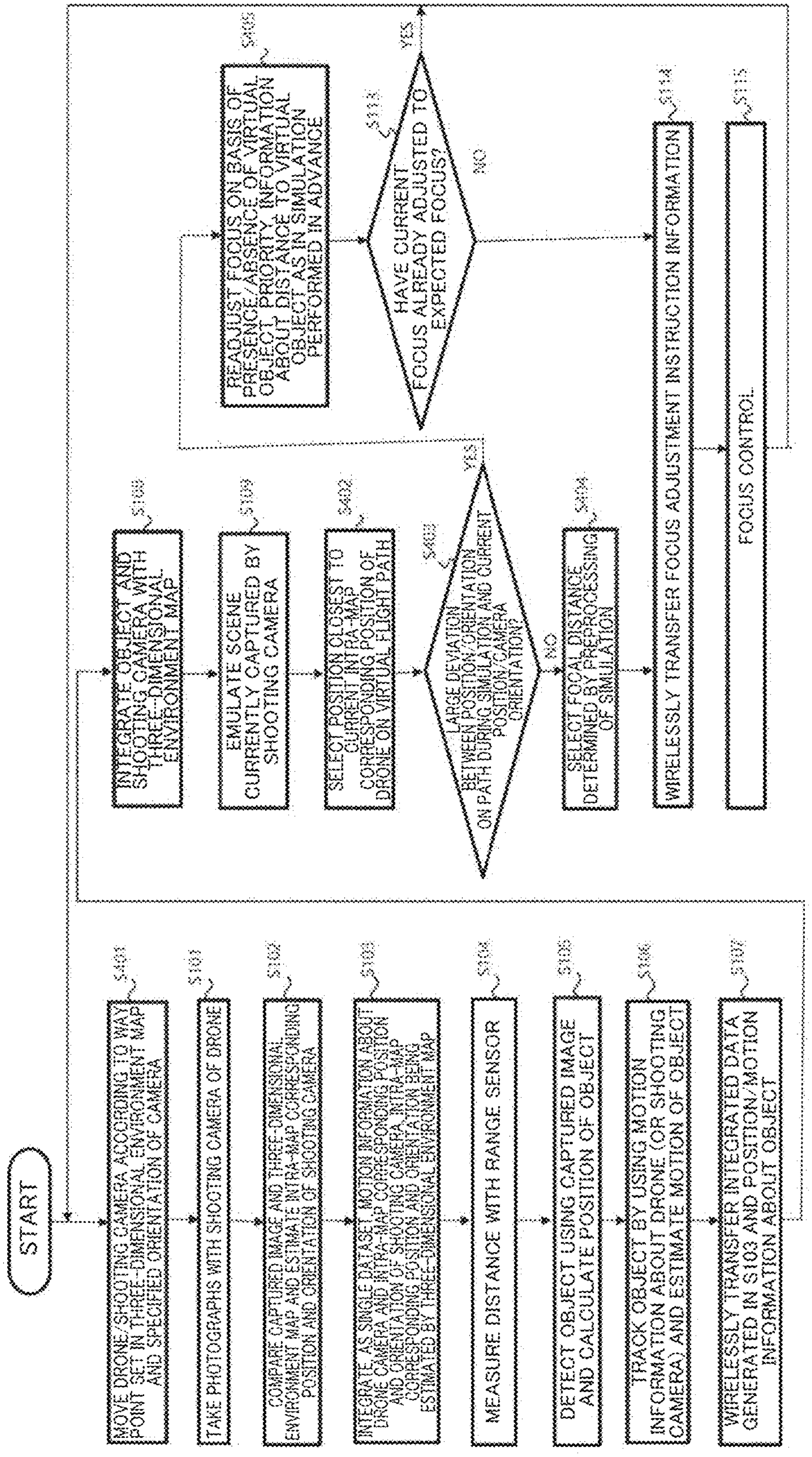
FIG. 22 is a flowchart of an operation example of the communication system according to the third embodiment.

FIG. 22 is a flowchart of an operation example of the communication system according to the third embodiment. Since steps S101 to S109 and S113 to S115 are identical to those in the flowchart of FIG. 9, the descriptions thereof are omitted. Steps S401 to S405 are additional steps.

In step S401, the flight control unit 103 of the drone 10 acquires an autonomous flight path and information about the orientation of the shooting camera 101 from the operating device 20, controls the flight of the drone 10 on the basis of the acquired information, and controls the orientation of the shooting camera 101.

In step S402, the simulation unit 211 of the operating device 20 selects a position (way point) closest to the current intra-map corresponding position of the drone 10 and an orientation set for the position (way point) on the virtual slight path of simulation The simulation unit 211 determines whether a difference is large between the selected position/orientation and the current intra-map corresponding position/the intra-map corresponding orientation of the drone 10. For example, if one of the differences is equal to or larger than a threshold value, it is determined that the deviation is large. If one of the differences is smaller than the threshold value, it is determined that the deviation is not large. If it is determined that the deviation is not large (NO at S403), the simulation unit 211 selects a focal distance corresponding to the closest position in the correspondence information and transmits focus adjustment instruction information indicating the focal distance to the drone 10 (S114). The drone 10 controls the focus of the shooting camera 101 on the basis of the focus adjustment instruction information (S115).

If it is determined that one of the differences is large (YES at S403), the focus adjustment calculation unit 206 determines a virtual focus region on the basis of an image in the field range of the virtual camera in the current intra-map corresponding orientation (S405). The virtual focus region may be determined by the same method as in simulation preparation processing. If multiple virtual objects are included, the virtual focus region may be determined on the basis of the priority levels of the virtual objects. The focus adjustment calculation unit 206 calculates a distance to the determined virtual focus region and determines whether a distance converted from the calculated distance on the target environment is equal to a distance to the current focus region from the shooting camera 101. If the distances are equal to each other (YES at S113), the process returns to step S401. Otherwise the process advances to steps S114 and S115. Processing in and after steps S114 and S115 is identical to that of the first embodiment.

In the present embodiment, correspondence information is used in focus control, and thus the processing is performed by the operating device 20.

Correspondence information may be provided to the drone 10 in advance, and the focus control unit 109 may autonomously perform focus control on the basis of the correspondence information. In this case, traffic between the drone 10 and the operating device 20 can be reduced.

As described above, according to the present embodiment, an image can be photographed in autonomous flight of the drone 10 while bringing a desired object of the user into focus.

Fourth Embodiment

In the first embodiment and others, information that specifies a virtual focus region (region-specific information) is superimposed on an image of the virtual camera, so that the information is visualized. As another embodiment, region-specific information may be visualized by superimposing the information on an image (may be referred to as a through image or a shooting camera image) of a shooting camera 101. Specifically, in the screen of a display unit 207, focus identification information is displayed at the same position as a virtual focus region determined as in the first embodiment, and a through image is displayed as a background image of the display unit 207. It is expected that a virtual target object in an image of a virtual camera and a target object in the through image are located at or nearly at the same position. Thus, according to this method, it is expected that the focus identification information is displayed to be at least partially superimposed on the target object in the through image. This allows a user to more easily or intuitively recognize a region expected to be focused by the shooting camera 101.

Figure 23:
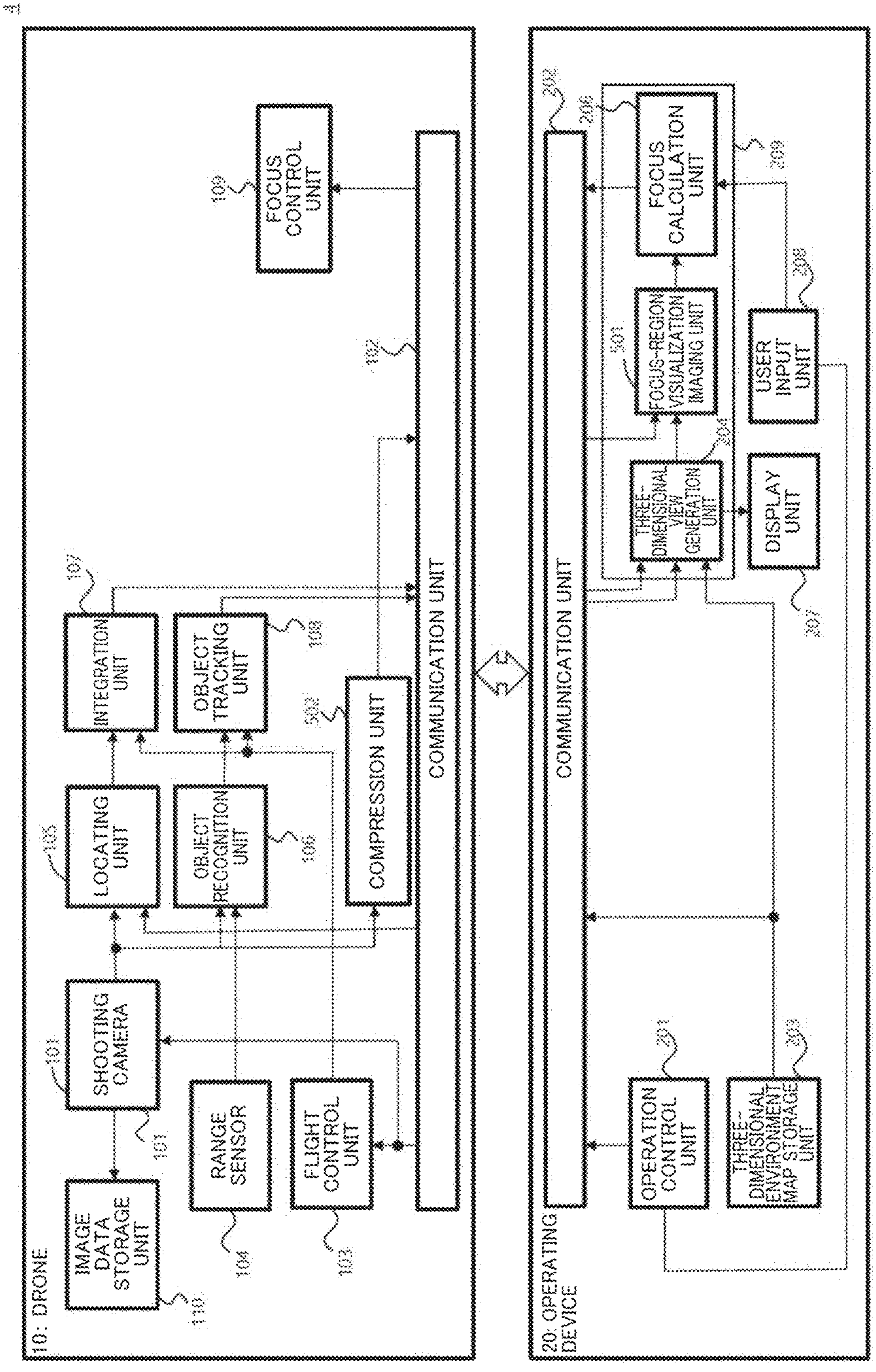
FIG. 23 illustrates a communication system according to a fourth embodiment.

FIG. 23 illustrates a communication system 4 according to a fourth embodiment of the present disclosure. A compression unit 502 is added to a drone 10. Moreover, a focus-region visualization imaging unit 501 is added to a processing unit 209 of an operating device 20. The same reference signs are assigned to elements having the same names as those illustrated in FIG. 2, and detailed descriptions are omitted as appropriate except for changed or extended processing.

The compression unit 502 of the drone 10 receives an image (through image) captured by the shooting camera 101 and compresses the image. For the compression, any method capable of reducing the data amount of an image with size reduction or resolution reduction may be used. The compression unit 502 transmits the data of the compressed image to the operating device 20 through a communication unit 102. The shooting camera 101 may select an image from a captured image with the same period as the period of provision of an image to a locating unit 105, and provide the image to the compression unit 502. Alternatively, the shooting camera 101 may select an image with a shorter or longer period than the period and provide the image to the compression unit 502.

As in the first embodiment, a three-dimensional view generation unit 204 places a virtual target object corresponding to a target object in a three-dimensional environment map, and generates an image of the field range of the virtual camera. The three-dimensional view generation unit 204 determines, as a virtual focus region, the region of a virtual target object included in the generated image. The virtual focus region may be determined by other methods. The three-dimensional view generation unit 204 provides the focus-region visualization imaging unit 501 with information about the range of the virtual focus region in the image. The range of the virtual focus region may be information indicating the positions of all pixels belonging to the region and may be represented in a predetermined format (e.g., the upper left coordinates, the horizontal size, and the vertical size of a rectangle) if the region has a specific shape, e.g., a rectangle.

The focus-region visualization imaging unit 501 acquires the data of the compressed through image from the drone 10 through the communication unit 202. In the acquired through image, region-specific information that specifies a focus region is superimposed on a region at the same position as a virtual focus region indicated in information acquired from the three-dimensional view generation unit 204. The superimposed image is displayed on the display unit 207. Although it is assumed that the compressed through image and the image of the virtual camera have the same size and resolution, the images may have different sizes and resolutions. In the case of different sizes and resolutions, the positional relationship between the images is considered as appropriate, so that a region at the same position as the virtual focus region can be specified in the compressed through image.

Figure 24:
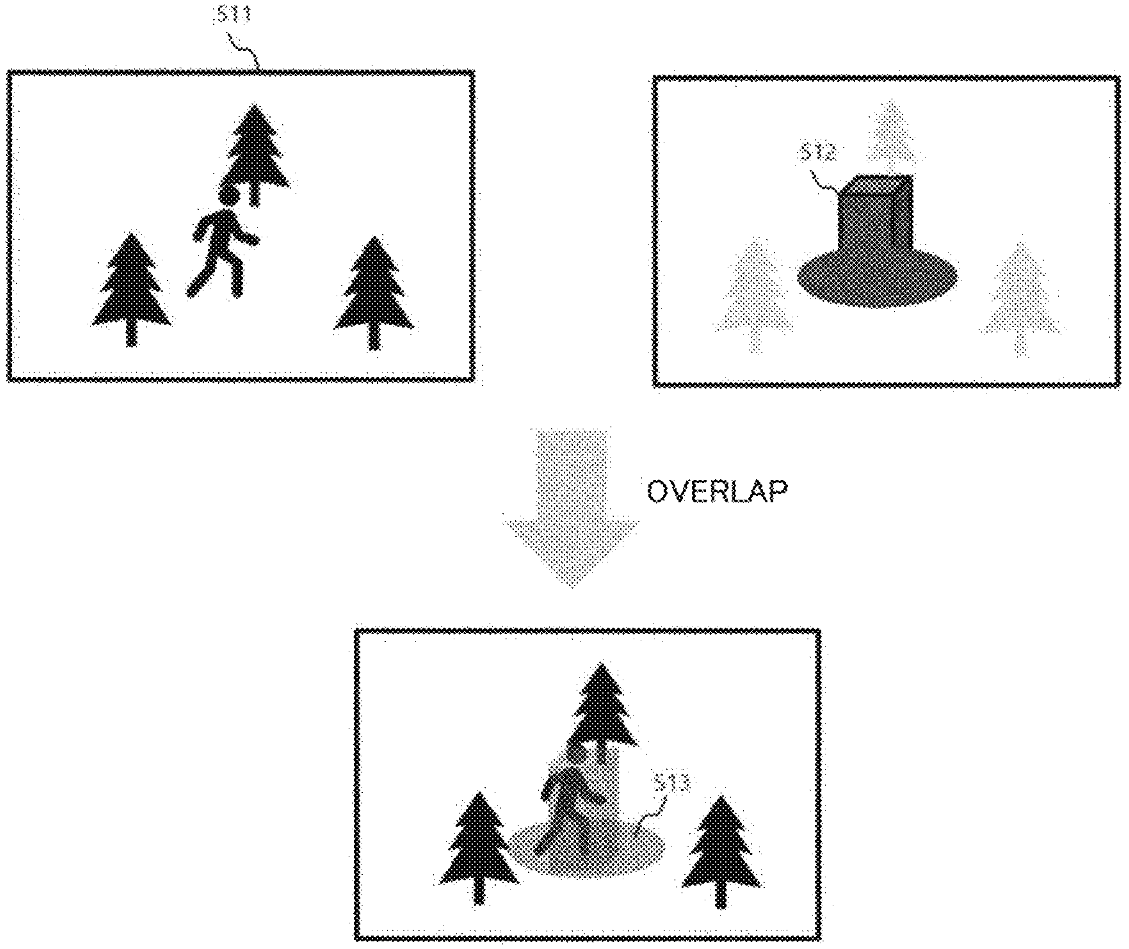
FIG. 24 illustrates a specific example of processing of a focus-region visualization imaging unit.

FIG. 24 shows a specific example of processing of the focus-region visualization imaging unit 501. The upper left drawing of FIG. 24 shows an example of a compressed through image 511 that is transmitted from the drone 10 when the drone 10 flies and takes photographs in the same environment as FIG. 5. The upper right drawing of FIG. 24 shows a virtual focus region 512 specified in an image of the field range of the virtual camera in the three-dimensional view generation unit 204 when the through image is acquired. The lower drawing of FIG. 24 shows an image of region-specific information 513 superimposed at the same position as the virtual focus region in the upper right drawing of FIG. 24 in the compressed through image in the upper left drawing of FIG. 24. The region-specific information 513 is translucent and allows a background image (target object) to show through the region-specific information 513. Thus, a user can easily recognize, with a sense of reality, a region expected to be focused by the shooting camera 101 in the through image. The region-specific information may be non-transparent and hide (make invisible) the background image of the virtual focus region.

Figure 25:
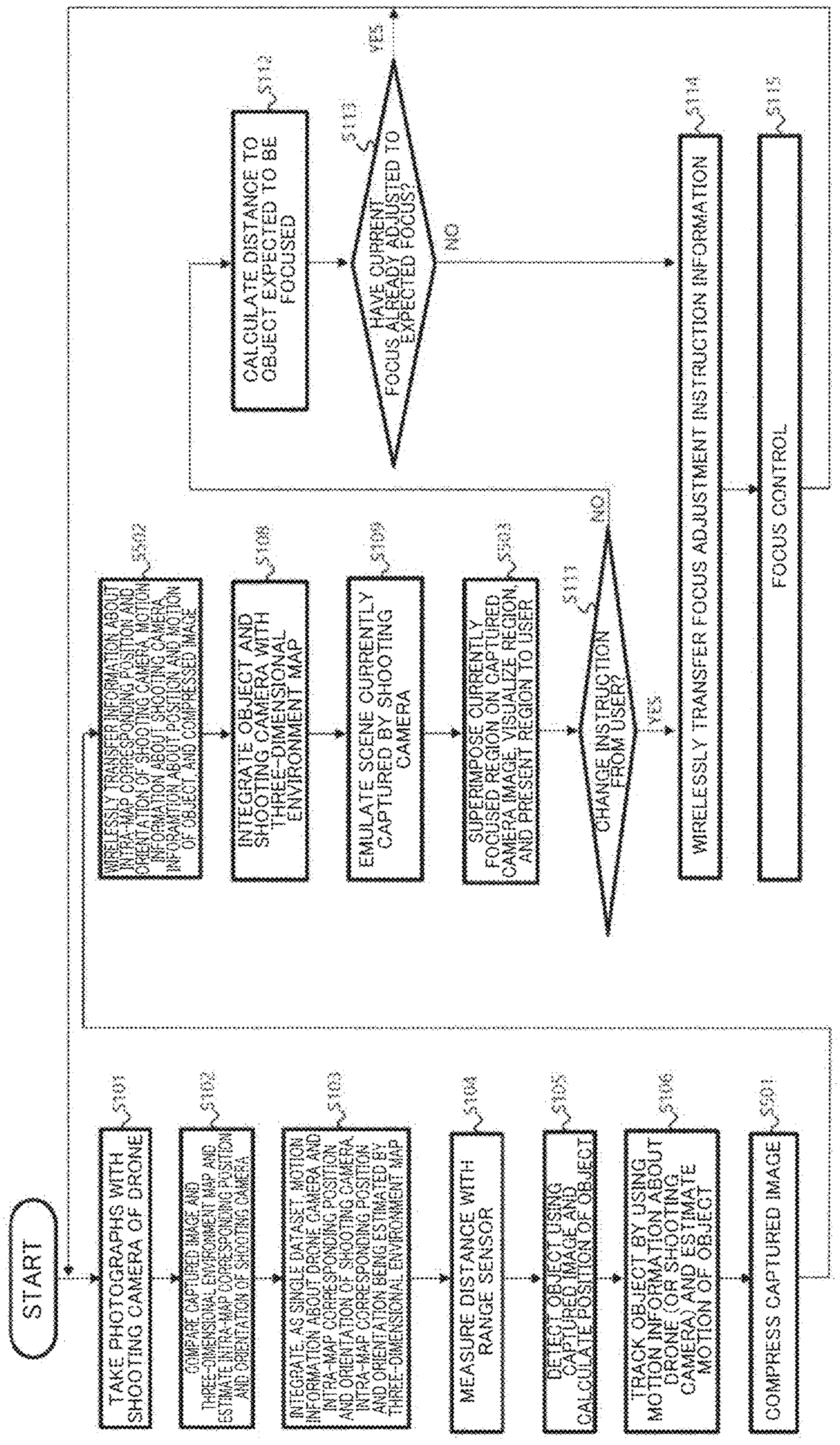
FIG. 25 is a flowchart of an operation example of the communication system according to the fourth embodiment.

FIG. 25 is a flowchart of an operation example of the communication system 4 according to the fourth embodiment. Since steps S101 to S106, S108, S109, and S111 to S115 are identical to those in the flowchart of FIG. 9, the descriptions thereof are omitted.

In step S501, the compression unit 502 of the drone 10 receives an image of the shooting camera 101 and compresses the image.

In step S502, the communication unit 102 transmits the data of the compressed image to the operating device 20 in addition to the transmission in step S107 of FIG. 9.

In step S503, in a received through image, the focus-region visualization imaging unit 501 superimposes region-specific information, which specifies a virtual focus region, at the same position as a virtual focus region generated by the three-dimensional view generation unit 204. The focus-region visualization imaging unit 501 displays the through image with the superimposed region-specific information on the display unit 207.

Thus, according to the present embodiment, information that specifies a virtual focus region is displayed to be superimposed on a captured image (through image) of the shooting camera 101, allowing the user to visually recognize, with an enhanced sense of reality, a region expected to be focused by the shooting camera 101.

Fifth Embodiment

In the foregoing embodiments, a distance from the virtual camera to the virtual target object (a distance to the virtual focus region) is converted into a distance in the target environment, and then the focus control of the shooting camera 101 is performed. Because of an individual difference of the shooting camera 101 or the range sensor 104, the converted distance may be different from an actual distance from the shooting camera 101 to the target object in the target environment and cause incorrect focus. In the present embodiment, focus is obtained with higher accuracy by calibrating a distance to a virtual target object.

Although the block diagram of a communication system according to the present embodiment is identical to the block diagrams of the foregoing embodiments, the processing of a focus adjustment calculation unit 206 is partially extended.

As in the first embodiment, the focus adjustment calculation unit 206 generates focus adjustment instruction information on the basis of a distance obtained by converting a distance from a virtual camera to a virtual target object into a distance in a target environment, and transmits the focus adjustment instruction information to a drone 10.

The focus adjustment calculation unit 206 acquires an image captured by a shooting camera 101 after (or immediately after) a focus adjustment (e.g., an adjustment to a camera parameter such as a focal distance) is made by a focus control unit 109 and a ranging image of a range sensor 104 from the drone 10. The focus adjustment calculation unit 206 acquires data indicating the relationship between a distance from the shooting camera 101 (a distance measurement value of a distance measurement image) and a contrast level on the basis of the acquired images. A contrast level at each distance can be calculated by, for example, integrating the high-frequency components of pixels at each distance in a captured image. The contrast increases with an integral, obtaining more correct focus. The focus adjustment calculation unit 206 specifies a distance corresponding to the maximum contrast level (peak) in acquired data. The focus adjustment calculation unit 206 calculates a difference between the specified distance and a distance obtained by converting a distance to the virtual focus region into a distance on the target environment.

Figure 26:
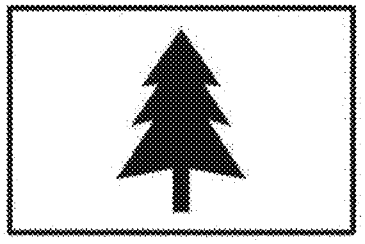
FIG. 26 shows an example of an image captured by a shooting camera after focus adjustment.

FIG. 26 shows an example of an image captured by the shooting camera 101 after a focus adjustment is made by the focus control unit 109.

Figure 27:
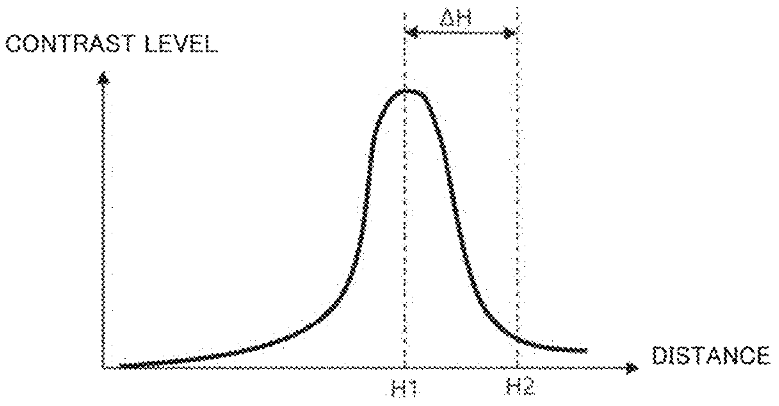
FIG. 27 shows an example of data indicating the relationship between a distance and a contrast level.

FIG. 27 shows an example of data indicating the relationship between a distance (a distance in the target environment) and a contrast level. FIG. 27 shows a distance H1 corresponding to the maximum contrast level (peak), a distance H2 obtained by converting a distance to the virtual focus region on the three-dimensional environment map into a distance on the target environment, and a difference AH between the distances H1 and H2.

The focus adjustment calculation unit 206 calibrates a distance (or the converted distance) to the virtual target object according to the calculated difference. As the calibration, for example, the difference is added or subtracted to or from a distance to the virtual focus region (or a distance obtained by converting the distance into a distance on the target environment). Alternatively, a value obtained by multiplying the difference by an adjustment factor is added or subtracted. The focus adjustment calculation unit 206 generates focus adjustment instruction information on the basis of a distance after the calibration. In this way, the focus adjustment calculation unit 206 calculates a difference between a distance from the virtual camera to the virtual focus region and a distance focused by the shooting camera 101 and generates focus adjustment instruction information according to the difference. The focus adjustment calculation unit 206 transmits the generated focus adjustment instruction information to the drone 10. The difference AH is calculated one time at the start of the flight of the drone 10, and then calibration may be performed each time by using the difference. Alternatively, the difference AH may be updated at regular time intervals by calculating the difference AH at regular time intervals.

In the foregoing example, a distance measurement image is used to calculate a difference. Calibration can be performed by other methods. For example, photographs are taken by the shooting camera 101 with the drone hovering in the air, the same processing as the first embodiment is performed, and a distance to the virtual target object is calculated. Moreover, while the drone is kept at the position, the focal distance of the lens of the shooting camera 101 is changed in a certain range, and an image is captured by the shooting camera 101 at a distance of each focal distance. In each captured image, the contrast level of a region including the target object is calculated. A focal distance with the highest contrast level is specified. On the basis of focus/distance correspondence data in which a focal distance of the lens and a distance with correct focus on the target environment are associated with each other in advance, a distance corresponding to the determined focal distance of the lens is acquired on the target environment. The acquired distance is compared with a distance obtained by converting a distance to the virtual focus region into a distance on the target environment, and a difference between the distances is calculated. A distance is calibrated by using the calculated difference as in the example of calibration. The foregoing processing is performed by the focus adjustment calculation unit 206.

As still another method of calibration, a phase difference between two formed images can be used. In the shooting camera 101, part of light passing through a lens (taking lens) from a subject (target object) is caused to enter an imaging element through a half mirror, and the other part of light is reflected in another direction by the half mirror. The reflected light is caused to enter two detection lenses and is input from the two detection lenses to two image sensors for detecting a phase difference. A distance to the subject is calculated from the phase difference between the images of the two image sensors. Information about the calculated distance is transmitted from the drone 10 to the operating device 20. The focus adjustment calculation unit 206 of the operating device 20 compares the received distance with a distance obtained by converting a distance to the virtual target object on the three-dimensional environment map into a distance on the target environment, and calculates a difference between the distances. The focus adjustment calculation unit 206 calibrates the calculated distance (or the converted distance) to the virtual target object according to the difference. As the calibration, for example, the difference or a value obtained by multiplying the difference by an adjustment factor is added or subtracted to or from a distance to the virtual target object (or a distance obtained by converting the distance into a distance on the target environment). The focus adjustment calculation unit 206 generates focus adjustment instruction information on the basis of a distance after the calibration, and transmits the information to the drone 10. A difference for calibration is calculated one time at the start or midpoint of the flight of the drone 10, and then calibration may be performed each time by using the difference. Alternatively, a difference value may be updated by calculating a difference at regular time intervals. Although a distance is calculated by the shooting camera 101, information about a phase difference may be transmitted to the operating device 20 and processing may be performed to calculate a distance from the phase difference by the focus adjustment calculation unit 206.

Modification Example

In the foregoing embodiments, the shooting camera is provided on the drone. The shooting camera is not always provided on the drone. For example, the shooting camera can be provided on mobile objects such as a truck, an AGV, a mobile robot, an electric train, an automobile, and a submarine according to the same embodiments.

In the foregoing embodiments, the three-dimensional environment map is produced using photogrammetry. An environment map (e.g., Occupancy Grid Map) may be produced in real time using sensors such as a range sensor included in a mobile body such as a draw. Furthermore, the foregoing embodiments can also be implemented in an environment where a GPS (Global Positioning Satellite, Global Positioning System) signal cannot be received.

In addition, the effects of the present disclosure described herein are merely exemplary and may have other effects.

The present invention is not limited to the foregoing embodiments. In the stage of implementation, the present invention can be embodied with the constituent elements that are modified without departing from the spirit of the invention. Furthermore, various inventions can be formed by properly combining a plurality of constituent elements disclosed in the embodiments. For example, some of all the constituent elements described in the embodiments may be deleted. In addition, the constituent elements in the different embodiments may be combined as appropriate.

The present disclosure may be configured as follows:

[Item 1]

An information processing method including: placing a virtual camera in a virtual environment space obtained by modeling a target environment in which a mobile object equipped with a shooting camera is allowed to move, the virtual camera being associated with the shooting camera;

determining a virtual focus region in the virtual environment space on the basis of an image corresponding to the field range of the virtual camera, the virtual focus region corresponding to a region focused by the shooting camera in the target environment; and displaying region-specific information on a display screen, the region-specific information specifying the virtual focus region.

[Item 2]

The information processing method according to item 1, wherein the image corresponding to the field range of the virtual camera includes at least one object, and an object is selected according to a first selection condition from the at least one object included in the image, and a region including the selected object is determined as the virtual focus region.

[Item 3]

The information processing method according to item 2, wherein the first selection condition includes at least one of a condition for selecting a moving object from the at least one object;

a condition for selecting, from the at least one object, an object on the basis of an area included in a first region range in the image; and a condition for selecting, from the at least one object, an object included in a first distance range from the virtual camera.

[Item 4]

The information processing method according to any one of items 1 to 3, further including: acquiring position information indicating the position of the shooting camera in the target environment; and placing the virtual camera at a first position in the virtual environment space, the first position corresponding to the position indicated by the position information.

[Item 5]

The information processing method according to item 4, further including: acquiring attitude information indicating the attitude of the shooting camera in the target environment; and placing the virtual camera in an attitude corresponding to the attitude indicated by the attitude information.

[Item 6]

The information processing method according to any one of items 1 to 5, further including: displaying the image corresponding to the field range of the virtual camera on the display screen: and placing the region-specific information in the virtual focus region in the image.

[Item 7]

The information processing method according to any one of items 1 to 6, further including: acquiring a captured image of the shooting camera; displaying the captured image on the display screen; and placing the region-specific information at a position in the captured image, the position corresponding to the position of the virtual focus region in the image corresponding to the field range of the virtual camera.

[Item 8]

The information processing method according to any one of items 1 to 7, further including: calculating a distance from the virtual camera to the virtual focus region; and transmitting focus adjustment instruction information to the mobile object, the focus adjustment instruction information providing an instruction to adjust the focus of the shooting camera to a region in the target environment corresponding to the virtual focus region on the basis of the calculated distance.

[Item 9]

The information processing method according to item 8, further including: adjusting a distance for adjusting the focus of the shooting camera by adjusting a camera parameter of the shooting camera on the basis of the focus adjustment instruction information.

[Item 10]

The information processing method according to any one of items 8 and 9, further including: acquiring instruction information for providing an instruction to change the virtual focus region, through a user input unit; and changing the virtual focus region on the basis of the instruction information.

[Item 11]

The information processing method according to any one of items 1 to 10, further including: acquiring motion information about the mobile object; predicting the position of the shooting camera after a first time on the basis of the motion information about the mobile object; and placing the virtual camera at a second position in the virtual environment space, the second position corresponding to the predicted position of the shooting camera.

[Item 12]

The information processing method according to item 11, further including: displaying the image corresponding to the field range of the virtual camera on the display screen;

acquiring motion information about a target object to be photographed by the shooting camera:

predicting the position of the target object after the first time on the basis of the motion information about the target object;

placing a virtual object representing the target object at a third position in the virtual environment space, the third position corresponding to the predicted position of the target object; and determining a region including the virtual object in the image corresponding to the field range of the virtual camera, as the virtual focus region.

[Item 13]

The information processing method according to item 11 or 12, wherein an image corresponding to the field range of the virtual camera disposed at the second position includes at least one object, and an object is selected according to a second selection condition from the at least one object included in the image, and a region including the selected object is determined as the virtual focus region.

[Item 14]

The information processing method according to item 13, wherein the second selection condition includes at least one of a condition for selecting a moving object from the at least one object;

a condition for selecting, from the at least one object, an object on the basis of an area included in a second region range in the image;

a condition for selecting, from the at least one object, an object included in a second distance range from the virtual camera; and a condition for selecting an object specified by a user from the at least one object.

[Item 15]

The information processing method according to any one of items 11 to 14, further including: acquiring operation information for providing an instruction to move the mobile object, through a user input unit;

transmitting the operation information to the mobile object; and acquiring motion information about the mobile object on the basis of the operation information.

[Item 16]

The information processing method according to any one of items 1 to 15, further including: performing simulation for moving the virtual camera or a virtual mobile object equipped with the virtual camera along a first route in the virtual environment space;

setting the virtual focus region for each of multiple positions on the first route; and generating correspondence information in which information about the set multiple virtual focus regions is associated with the multiple positions.

[Item 17]

The information processing method according to item 16, further including: causing the mobile object to move autonomously on the basis of a second route of the target environment, the second route corresponding to the first route of the virtual environment space;

acquiring position information indicating the position of the mobile object or the position of the shooting camera from the mobile object moving autonomously;

selecting information about a virtual focus region from the correspondence information on the basis of a position in the virtual environment space, the position corresponding to the position indicated by the position information; and transmitting focus adjustment instruction information to the mobile object, the focus adjustment instruction information providing an instruction to adjust the focus of the shooting camera to a region in the target environment corresponding to the virtual focus region indicated by the selected information.

[Item 18]

The information processing method according to item 17, further including: displaying the correspondence information on the display screen;

acquiring instruction information for providing an instruction to change the virtual focus region with respect to one of the multiple positions included in the correspondence information, through the user input unit; and updating information about the virtual focus region corresponding to the one position in the correspondence information on the basis of the instruction information.

[Item 19]

The information processing method according to any one of items 8 to 18, further including: calculating a difference between a distance from the virtual camera to the virtual focus region and a distance focused by the shooting camera; and generating the focus adjustment instruction information according to the difference.

[Item 20]

The information processing method according to any one of items 1 to 19, wherein the mobile object is a drone.

[Item 21]

An information processing device including: a processing unit that places a virtual camera in a virtual environment space obtained by modeling a target environment in which a mobile object equipped with a shooting camera is allowed to move, the virtual camera being associated with the shooting camera, the processing unit determining a virtual focus region in the virtual environment space on the basis of an image corresponding to the field range of the virtual camera, the virtual focus region corresponding to a region focused by the shooting camera in the target environment; and a display unit that displays region-specific information on a display screen, the region-specific information specifying the virtual focus region.

[Item 22]

A computer program for causing a computer to execute the steps of placing a virtual camera in a virtual environment space obtained by modeling a target environment in which a mobile object equipped with a shooting camera is allowed to move, the virtual camera being associated with the shooting camera;

determining a virtual focus region in the virtual environment space on the basis of an image corresponding to the field range of the virtual camera, the virtual focus region corresponding to a region focused by the shooting camera in the target environment; and displaying region-specific information on a display screen, the region-specific information specifying the virtual focus region.

[Item 23]

A communication system including a mobile object that is movable in a target environment and is equipped with a shooting camera; and an operating device that operates the mobile object, wherein the operating device includes:

a virtual environment space obtained by modeling the target environment;

a receiving unit that receives information allowing a position to be specified in the virtual environment space, the position corresponding to the position of the shooting camera;

a processing unit that places a virtual camera at the position indicated by the information and determines a virtual focus region corresponding to a region focused by the shooting camera, in the virtual environment space on the basis of an image corresponding to the field range of the virtual camera; and a display unit that displays region-specific information specifying the virtual focus region.

REFERENCE SIGNS LIST

1 to 4 Communication system
10 Drone
20 Operating device
21 Path
30 User
50 Mobile object
51 User
52 Camera
53 Image
60 Target environment
61 Target object
70 Three-dimensional environment map
71 Virtual camera
71A Field range
73 Virtual drone
72 Virtual target object
80 Image
81 Region-specific information
82 Region-specific information
83 Image
84 Region
85 Virtual object
86 Region-specific information

87 Virtual object
88 Region-specific information
101 Shooting camera
101A Field angle
102 Communication unit
103 Flight control unit
104 Range sensor
105 Locating unit
106 Object recognition unit
107 Integration unit
108 Object tracking unit
109 Focus control unit
110 Image data storage unit
111 Rotor
201 Operation control unit
202 Communication unit
203 Three-dimensional environment map storage unit
204 Three-dimensional view generation unit
205 Future-prediction-view generation unit
206 Focus adjustment calculation unit
207 Display unit
208 User input unit
209 Processing unit
211 Simulation unit
501 Focus-region visualization imaging unit
502 Compression unit
511 Through image
512 Virtual focus region
513 Region-specific information
A Distance
B Distance
D1 Depth of field
D2 Depth of field
D11 to D13 Depth of field
G1 Graph
H1, H2 Distance
P1 to P3 Processing
R11 Virtual flight path

The invention claimed is:

1. An information processing method comprising: placing a virtual camera in a virtual environment space obtained by modeling a target environment in which a mobile object equipped with a shooting camera is allowed to move, the virtual camera being associated with the shooting camera;

determining a virtual focus region in the virtual environment space on a basis of an image corresponding to a field range of the virtual camera, the virtual focus region corresponding to a region focused by the shooting camera in the target environment; and displaying region-specific information on a display screen, the region-specific information specifying the virtual focus region.

2. The information processing method according to claim 1, wherein the image corresponding to the field range of the virtual camera includes at least one object, and an object is selected according to a first selection condition from the at least one object included in the image, and a region including the selected object is determined as the virtual focus region.

3. The information processing method according to claim 2, wherein the first selection condition includes at least one of a condition for selecting a moving object from the at least one object;

a condition for selecting, from the at least one object, an object on a basis of an area included in a first region range in the image; and a condition for selecting, from the at least one object, an object included in a first distance range from the virtual camera.

4. The information processing method according to claim 1, further comprising: acquiring position information indicating a position of the shooting camera in the target environment; and placing the virtual camera at a first position in the virtual environment space, the first position corresponding to the position indicated by the position information.

5. The information processing method according to claim 4, further comprising: acquiring attitude information indicating an attitude of the shooting camera in the target environment; and placing the virtual camera in an attitude corresponding to the attitude indicated by the attitude information.

6. The information processing method according to claim 1, further comprising: displaying the image corresponding to the field range of the virtual camera on the display screen; and placing the region-specific information in the virtual focus region in the image.

7. The information processing method according to claim 1, further comprising: acquiring a captured image of the shooting camera; displaying the captured image on the display screen; and placing the region-specific information at a position in the captured image, the position corresponding to a position of the virtual focus region in the image corresponding to the field range of the virtual camera.

8. The information processing method according to claim 1, further comprising: calculating a distance from the virtual camera to the virtual focus region; and transmitting focus adjustment instruction information to the mobile object, the focus adjustment instruction information providing an instruction to adjust focus of the shooting camera to a region in the target environment corresponding to the virtual focus region on a basis of the calculated distance.

9. The information processing method according to claim 8, further comprising: adjusting a distance for adjusting the focus of the shooting camera by adjusting a camera parameter of the shooting camera on a basis of the focus adjustment instruction information.

10. The information processing method according to claim 8, further comprising: acquiring instruction information for providing an instruction to change the virtual focus region, through a user input unit; and changing the virtual focus region on a basis of the instruction information.

11. The information processing method according to claim 1, further comprising: acquiring motion information about the mobile object; predicting a position of the shooting camera after a first time on a basis of the motion information about the mobile object; and placing the virtual camera at a second position in the virtual environment space, the second position corresponding to the predicted position of the shooting camera.

12. The information processing method according to claim 11, further comprising: displaying the image corresponding to the field range of the virtual camera on the display screen;

acquiring motion information about a target object to be photographed by the shooting camera;

predicting a position of the target object after the first time on a basis of the motion information about the target object;

placing a virtual object representing the target object at a third position in the virtual environment space, the third position corresponding to the predicted position of the target object; and determining a region including the virtual object in the image corresponding to the field range of the virtual camera, as the virtual focus region.

13. The information processing method according to claim 11, wherein an image corresponding to the field range of the virtual camera disposed at the second position includes at least one object, and an object is selected according to a second selection condition from the at least one object included in the image, and a region including the selected object is determined as the virtual focus region.

14. The information processing method according to claim 13, wherein the second selection condition includes at least one of a condition for selecting a moving object from the at least one object;

a condition for selecting, from the at least one object, an object on a basis of an area included in a second region range in the image;

a condition for selecting, from the at least one object, an object included in a second distance range from the virtual camera; and a condition for selecting an object specified by a user from the at least one object.

15. The information processing method according to claim 11, further comprising: acquiring operation information for providing an instruction to move the mobile object, through a user input unit;

transmitting the operation information to the mobile object; and acquiring motion information about the mobile object on a basis of the operation information.

16. The information processing method according to claim 1, further comprising: performing simulation for moving the virtual camera or a virtual mobile object equipped with the virtual camera along a first route in the virtual environment space;

setting the virtual focus region for each of multiple positions on the first route; and generating correspondence information in which information about the set multiple virtual focus regions is associated with the multiple positions.

17. The information processing method according to claim 16, further comprising: causing the mobile object to move autonomously on a basis of a second route of the target environment, the second route corresponding to the first route of the virtual environment space;

acquiring position information indicating a position of the mobile object or a position of the shooting camera from the mobile object moving autonomously;

selecting information about a virtual focus region from the correspondence information on a basis of a position in the virtual environment space, the position corresponding to the position indicated by the position information; and transmitting focus adjustment instruction information to the mobile object, the focus adjustment instruction information providing an instruction to adjust focus of the shooting camera to a region in the target environment corresponding to the virtual focus region indicated by the selected information.

18. The information processing method according to claim 17, further comprising: displaying the correspondence information on the display screen;

acquiring instruction information for providing an instruction to change the virtual focus region with respect to one of the multiple positions included in the correspondence information, through the user input unit; and updating information about the virtual focus region corresponding to the one position in the correspondence information on a basis of the instruction information.

19. The information processing method according to claim 8, further comprising: calculating a difference between a distance from the virtual camera to the virtual focus region and a distance focused by the shooting camera; and generating the focus adjustment instruction information according to the difference.

20. The information processing method according to claim 1, wherein the mobile object is a drone.

21. An information processing device comprising: circuitry that places a virtual camera in a virtual environment space obtained by modeling a target environment in which a mobile object equipped with a shooting camera is allowed to move, the virtual camera being associated with the shooting camera, the circuitry determining a virtual focus region in the virtual environment space on a basis of an image corresponding to a field range of the virtual camera, the virtual focus region corresponding to a region focused by the shooting camera in the target environment; and a display that displays region-specific information on a display screen, the region-specific information specifying the virtual focus region.

22. A non-transitory computer-readable medium having embodied thereon a program, which when executed by a computer causes the computer to execute a method comprising:

placing a virtual camera in a virtual environment space obtained by modeling a target environment in which a mobile object equipped with a shooting camera is allowed to move, the virtual camera being associated with the shooting camera;

determining a virtual focus region in the virtual environment space on a basis of an image corresponding to a field range of the virtual camera, the virtual focus region corresponding to a region focused by the shooting camera in the target environment; and displaying region-specific information on a display screen, the region-specific information specifying the virtual focus region.

23. A communication system comprising a mobile object that is movable in a target environment and is equipped with a shooting camera; and an operating device that operates the mobile object, wherein the operating device includes:

a virtual environment space obtained by modeling the target environment; and circuitry that receives information allowing a position to be specified in the virtual environment space, the position corresponding to the position of the shooting camera, and places a virtual camera at the position indicated by the information and determines a virtual focus region corresponding to a region focused by the shooting camera, in the virtual environment space on a basis of an image corresponding to the field range of the virtual camera; and a display that displays region-specific information specifying the virtual focus region.

* * * * *